(12) United States Patent
Ohkuma et al.

(10) Patent No.: US 7,305,085 B2
(45) Date of Patent: Dec. 4, 2007

(54) ENCRYPTION APPARATUS AND METHOD, AND DECRYPTION APPARATUS AND METHOD BASED ON BLOCK ENCRYPTION

(75) Inventors: Kenji Ohkuma, Yokohama (JP); Fumihiko Sano, Fuchu (JP); Hirofumi Muratani, Kawasaki (JP); Shinichi Kawamura, Kodaira (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 705 days.

(21) Appl. No.: 09/893,785

(22) Filed: Jun. 29, 2001

(65) Prior Publication Data

US 2002/0016773 A1 Feb. 7, 2002

(30) Foreign Application Priority Data

Jun. 30, 2000 (JP) .............................. 2000-198478

(51) Int. Cl.
H04L 9/28 (2006.01)
H04L 9/06 (2006.01)
H04K 1/00 (2006.01)

(52) U.S. Cl. .......................... 380/42; 380/28; 380/259; 380/37

(58) Field of Classification Search ................. 380/37, 380/42, 43, 259, 28
See application file for complete search history.

(56) References Cited

U.S. PATENT DOCUMENTS 3,798,359 A * 3/1974 Feistel .......................... 380/37
4,275,265 A * 6/1981 Davida et al. ................ 380/29
4,751,733 A * 6/1988 Delayaye et al. ............. 380/42
5,727,062 A * 3/1998 Ritter .......................... 380/37
6,182,216 B1 * 1/2001 Luyster ...................... 713/168
6,769,063 B1 * 7/2004 Kanda et al. ............... 713/193
7,194,090 B2 * 3/2007 Muratani et al. ............. 380/29

OTHER PUBLICATIONS

V. Rijmen, et al., "The Cipher SHARK", Fast Software Encryption, LNCS 1039, 1996, pp. 100-111.
Kazumaro Aoki, et al., "Stricter Evaluation for the Maximum Average of Differential Probability and the Maximum Average of Linear Probability", SCIS 96-4A, 1996, 12 pages.
Mitsuru Matsui, "Block Encryption Algorithm MISTY", ISEC 96-11, 1996, pp. 1-14.
J. Daemen, et al., "The Block Cipher SQUARE", Fast Software Encryption, 1997 (FSE97), LNCS 1267, pp. 149-165.
J. Daemen, et al., "AES Proposal: Rijndael", Document Version 2, 1999, pp. 1-45.

(Continued)

*Primary Examiner*—Emmanuel L. Moise
*Assistant Examiner*—Zachary A. Davis
(74) *Attorney, Agent, or Firm*—Oblon, Spivak, McClelland, Maier & Neustadt, P.C.

(57) ABSTRACT

In each stage, multiple parallel nonlinear transformation modules each perform local lower-level diffusion, then a diffusion module performs higher-level diffusion over the block width and multiple parallel nonlinear transformation modules each perform local lower-level diffusion. This operation is repeated a predetermined number of times corresponding to the number of stages. Each nonlinear transformation module is formed into the nested SPN structure by arranging alternately nonlinear transformation modules and a diffusion module. The diffusion module performs linear transformation for spreading the state of at least one bit in input data to the preceding nonlinear transformation modules to at least one bit in input data to the succeeding nonlinear transformation modules.

9 Claims, 31 Drawing Sheets

OTHER PUBLICATIONS

A.J. Menezes, et al., Handbook of Applied Cryptography, CRC Press, 1996, 11 pages.

B. Schneier, Applied Cryptography, Second Edition, 1995, 10 pages.

K. Ohkuma, et al., "The block cipher Hierocrypt", Proceedings of Selected Area in Cryptography 2000 (SAC 2000), 2000, pp. 70-82.

K. Ohkuma, et al., "Security and Performance Evaluations for the block ciphers Hierocrypt-3 and Hierocrypt-L1", Technical Report of IEICE, ISEC-71, 2000(Japan), 2001, pp. 71-100.

K. Ohkuma, et al., The Institute of Electronics, Information and Communication Engineers, vol. 99, No. 702, pp. 99-104, "On the Recursive SPN Structure", Mar. 17, 2000 (with English Abstract).

K. Ohkuma, et al., The Institute of Electronics, Information and Communication Engineers, vol. 100, No. 76, pp. 77-104, "Specification and Assessment of the Block Cipher Hierocrypt", May 18, 2000.

* cited by examiner

```
s[256]={
  72 AA 49 16 1E 3A 43 AE 66 BC 00 73 79 3B FB 9F
  69 6A A2 50 6E F5 EF AC 22 02 AD 26 E2 DF 97 F0
  9E BF 17 8B FA 7C F4 71 7F CA F6 52 FD C3 E5 64
  53 8D E0 F3 0F 78 CB 9B 68 3C 0D 1F 89 B6 EB F7
  44 4A 06 A6 56 6B 85 01 30 88 51 31 9C A0 A3 25
  60 5B FF 05 B7 91 15 B3 A9 20 03 2B 61 42 95 4D
  F9 7E 0E E9 D8 F1 46 99 CE BE D9 54 80 B0 D2 4F
  7A E8 35 92 1B 7B 12 D6 4C D5 E7 EE B1 24 DE 21
  04 10 AB 29 9A 81 FE A7 B8 63 28 0A 8A D1 C6 07
  B9 C8 98 82 74 9D 84 47 94 C7 6C 11 D7 BA C1 C9
  DD 77 39 2F 2E C2 67 41 E4 58 34 CD 1C 93 96 7D
  2C F8 B5 70 14 08 DC CC 87 D0 5E 32 C5 C4 59 3E
  CF 55 5C 23 75 2D 2A 86 4B 1D 5F E6 FC B2 4E 09
  27 AF 19 B4 BD 6D 3D 6F ED 62 EA F2 D3 36 38 DB
  BB 83 45 37 A4 EC 8C 5D E1 33 90 A1 40 8E 1A A5
  0B 3F 5A DA 13 76 0C C0 48 E3 65 A8 18 8F D4 57 }
```

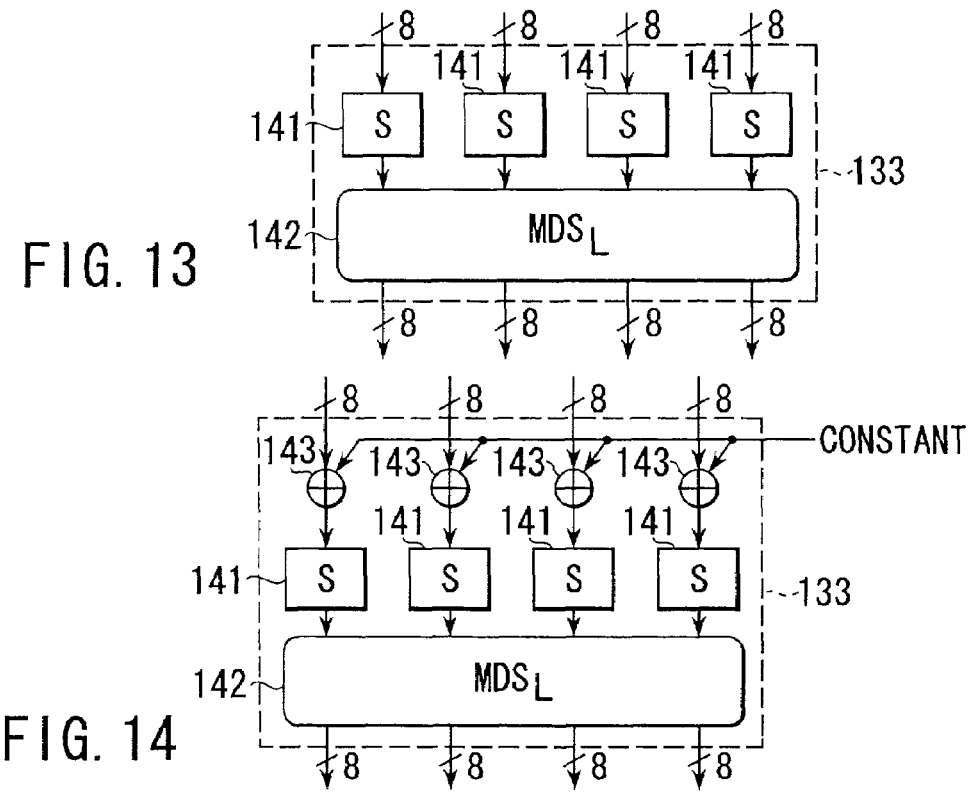

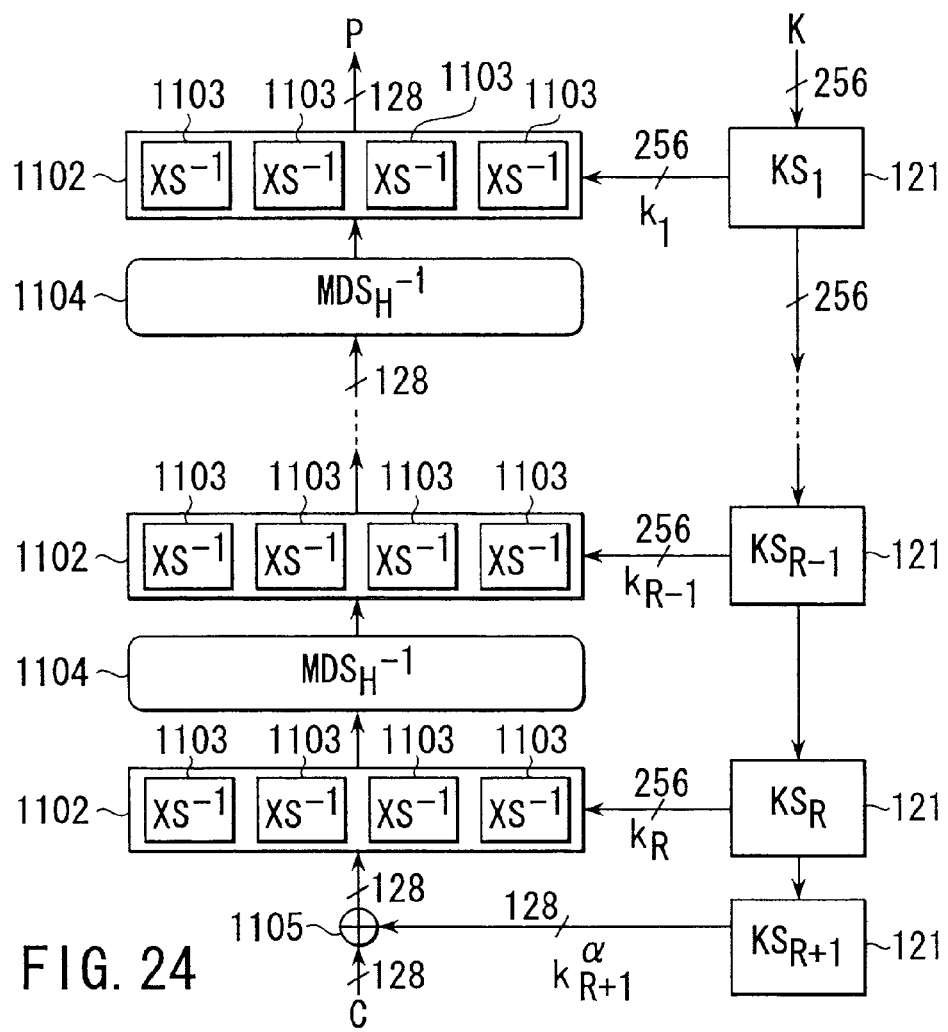
FIG. 24
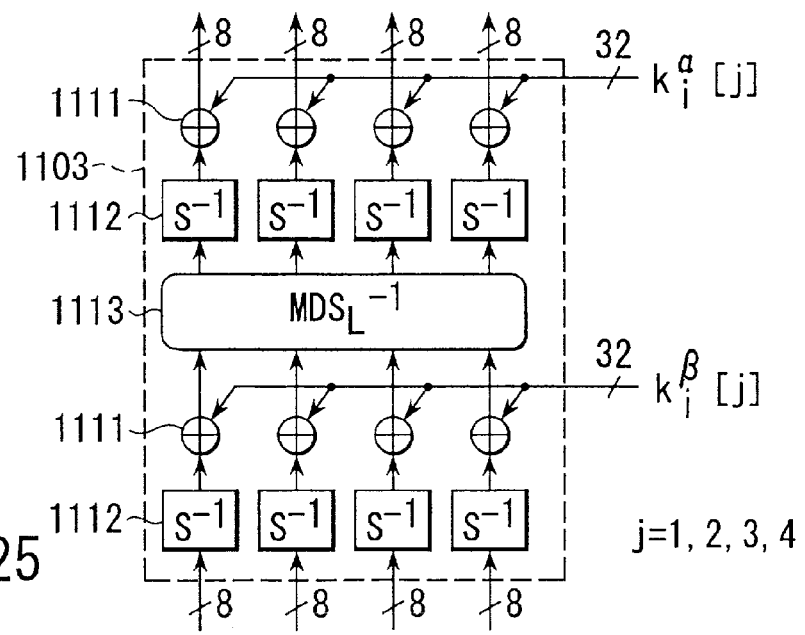
FIG. 25  $j=1, 2, 3, 4$

ENCRYPTION APPARATUS AND METHOD, AND DECRYPTION APPARATUS AND METHOD BASED ON BLOCK ENCRYPTION

CROSS-REFERENCE TO RELATED APPLICATIONS

This application is based upon and claims the benefit of priority from the prior Japanese Patent Application No. 2000-198478, filed Jun. 30, 2000, the entire contents of which are incorporated herein by reference.

BACKGROUND OF THE INVENTION

1. Field of the Invention

The present invention relates to an encryption apparatus and method, and a decryption apparatus and method based on block encryption scheme, and an operating unit used in the encryption and decryption apparatuses.

2. Description of the Related Art

Typical fundamental structures of common key block encryption scheme include SPN type and Feistel type. For both structures, a design method for improving strength evaluation and resiliency against differential/linear cryptanalysis have been studied (reference [1] V. Rijmen, J. Daemen, B. Preneel, A. Bosselaers & E. DeWin, "The Cipher SHARK," Fast Software Encryption, LNCS 1039, 1996, reference [2] Kazumaro Aoki, Kazuo Ota, "More Strict Evaluation of Maximum Mean Differential Probability and Maximum Mean Linear Probability," SCIS 96-4A, 1996, reference [3], Mitsuru Matsui, "Block encryption scheme MISTY," ISEC 96-11, 1996).

With the SPN structure, since the number of active S-boxes can be guaranteed, the number of stages for achieving the set strength can be easily determined (reference [1]). However, when the block size increases, and the parallelness of S-boxes becomes high, the process of diffusion layers becomes complicated, resulting in low speed.

SQUARE/Rijndael Cipher can solve this problem (reference [4] J. Daemen, L. R. Knudsen & V. Rijmen, "The Block encryption scheme Square," Fast Software Encryption, LNCS 1267, 1997, reference [5] J. Daemen & V. Rijmen, "AES Proposal: Rijndael, "http://www.east.kuleuven.ac.be/~rijmen/rijdael/rijndaeldocV2.zip).

In cipher of this type, 16 parallel S-boxes are arranged in a 4×4 matrix to limit linear diffusion within a single column, thus reducing the processing load. By combining rearrangement of byte positions with linear diffusion, the influence of one byte in a given stage is diffused to all bytes two stages later, and 25 or more active S-boxes in four stages (robust against differential/linear cryptanalysis) are achieved.

However, since bytes in a single column do not mix in the next stage, dedicated attack called SQUARE attack is present (reference [1], reference [5]). This results from achievement of both high strength and efficiency under the restriction of only one type of diffusion layers.

The SPN structure allows easy estimation of the lower limit of the number of active S-boxes, and can be designed to guarantee high strength against differential/linear cryptanalysis. However, when the parallelness of S-boxes becomes higher with increasing block size of plaintext/ciphertext, the calculation cost of a coupling portion of diffusion layers becomes high. Also, uniform data diffusion cannot be attained depending on the design of diffusion layers.

BRIEF SUMMARY OF THE INVENTION

Accordingly, the present invention is directed to method and apparatus that substantially obviates one or more of the problems due to limitations and disadvantages of the related art.

According to one aspect of the present invention, an apparatus for encrypting block data comprises encrypting sections connected in series. Each of the encrypting sections comprises a first unit configured to randomize first subblock data which are obtained by dividing the block data; and a second unit configured to diffuse data output from the first unit with respect to a range which is wider than a range of the first subblock data and supply a result of diffusion to a first unit in a succeeding encrypting section. At least one bit of data input to the first unit in own encrypting section is transmitted to at least one bit of data input to the first unit in the succeeding encrypting section via at least two routes.

According to another aspect of the present invention, an apparatus for encrypting block data comprises encrypting sections connected in series. Each of the encrypting sections comprises first nonlinear transformation units configured to perform a nonlinear transformation process over first subblock data which are obtained by dividing the block data; and a first linear diffusion unit configured to perform a linear diffusion process over data output from the first nonlinear transformation units with respect to a range which is wider than a range of the first subblock data and supply a result of diffusion to first nonlinear transformation units in a succeeding encrypting section. Each of the first nonlinear transformation units comprises second nonlinear transformation units configured to perform a nonlinear transformation process over second subblock data which are obtained by dividing the first subblock data; and a second linear diffusion unit configured to perform a linear diffusion process over data output from the second nonlinear transformation units with respect to the range of the first subblock data. At least one bit of data input to one of the second nonlinear transformation units in each of the encrypting sections is transmitted to at least one bit of data input to one of the second nonlinear transformation units in the succeeding encrypting section via at least two routes.

The principles of the encryption apparatus of the invention may be applied equally to the encryption method, decryption apparatus and decryption method. The present invention may further be implemented in the form of a computer-readable recording medium recorded with a program that allows the computer to execute the inventive procedure (or allows the computer to function as the inventive apparatus or allows the computer to implement the inventive function).

In embodiments of the present invention, a lower-level diffusion layer adapted for local data diffusion (randomization) and a higher-level diffusion layer adapted for data diffusion over a wide range are arranged alternately. The use of different types of diffusion (e.g., two stages of diffusion) allows highly uniform diffusion to be implemented while checking the calculation cost. Moreover, the branch number can be hierarchically guaranteed (hierarchy of the branch number), and the lower limit of the number of active S-boxes can be easily guaranteed. Furthermore, the strength evaluation can be easily made.

The SQUARE encryption and Rijndael encryption achieve the same effects as the present invention through lower-level diffusion and rearrangement in units of bytes. However, these encryption methods are subject to SQUARE attack because only one type of diffusion is used. The present invention uses two types of diffusion layers (higher-level and lower-level diffusion layers), resulting in increased resilience to SQUARE attack.

By devising the structure of the higher-level diffusion layer, for example, by doubling all or part of differential paths between the first-half S-boxes and the second-half S-boxes, a high avalanche effect can be achieved, resulting in increased resilience to SQUARE attack.

BRIEF DESCRIPTION OF THE SEVERAL VIEWS OF THE DRAWING

FIG. 13 is a block diagram showing an example of the internal arrangement of a nonlinear transformation layer;

FIG. 14 is a block diagram showing another example of the internal arrangement of the nonlinear transformation layer;

FIG. 15 shows an example of an additive constant table;

FIG. 24 is a block diagram showing an example of the arrangement of a decryption apparatus;

FIG. 25 shows an example of the internal arrangement of the inverse transform of an extended S-box;

DETAILED DESCRIPTION OF THE INVENTION

A preferred embodiment of an encryption apparatus and method, and a decryption apparatus and method based on block encryption scheme, and an operating unit used in the encryption and decryption apparatuses according to the present invention will now be described with reference to the accompanying drawings.

In the embodiment, nested (recursive) SPN encryption as a combination of local randomization (lower-level diffusion) and diffusion over the block width (higher-level diffusion) will be explained. In the following description, encryption will be mainly explained, and decryption will then be explained. Note that a decryption algorithm is an inverse transform of an encryption algorithm, and a key is a secret key common to encryption and decryption. The encryption system of this embodiment can be implemented by either hardware or software, and an arrangement example to be described below can be achieved as a functional block diagram of an encryption apparatus (decryption apparatus) or a functional module diagram of an encryption algorithm (decryption algorithm).

Figure 1:
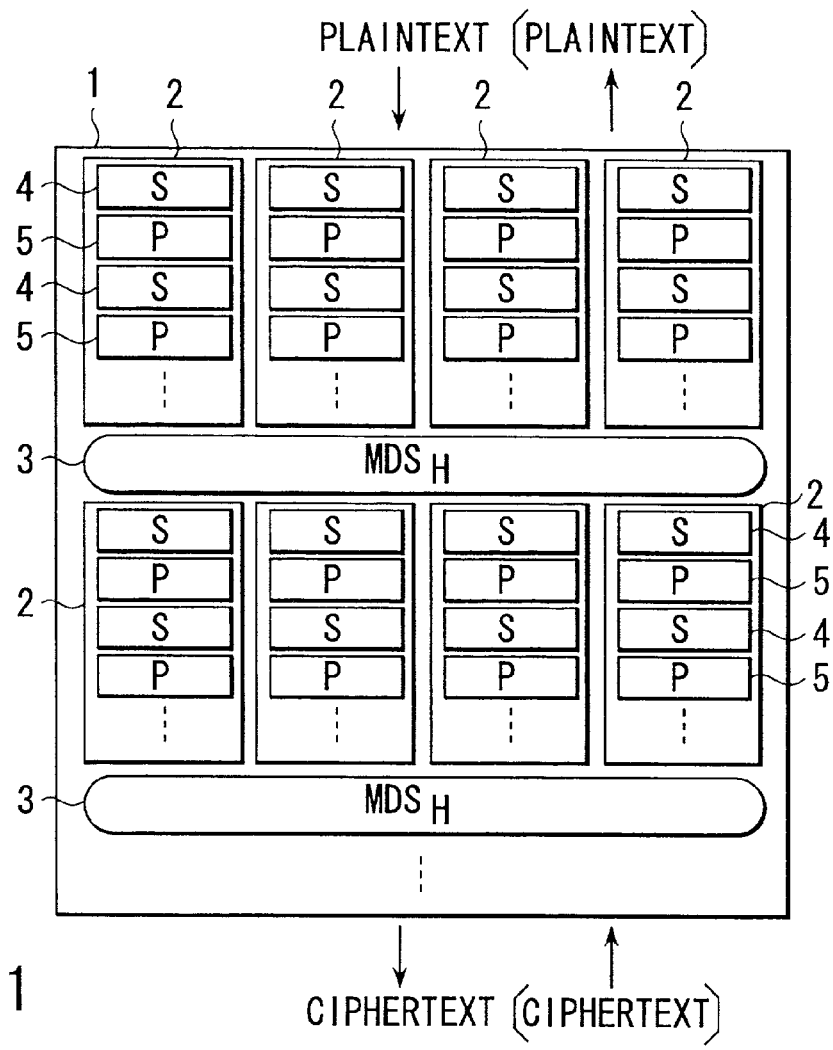
FIG. 1 is a view for explaining the basic configuration of encryption according to the first embodiment of the present invention.

FIG. 1 shows an example of the basic configuration of nested SPN encryption (an encryption (or decryption) apparatus or encryption (or decryption) algorithm, an encryption processing apparatus).

As shown in FIG. 1, in the nested SPN structure, each of a plurality of parallel nonlinear transformation modules (extended S-boxes in an example to be described later) 2 in each stage executes local, lower-level diffusion, a diffusion module (a higher-level MDS in an example to be described later) 3 executes broad, higher-level diffusion over the block width, the nonlinear transformation modules 2 execute local, lower-level diffusions, . . . , and this process is repeated at a predetermined number of stages. Each nonlinear transformation module 2 is constructed by alternately arranging nonlinear transformation modules (S-boxes in an example to be described later) and diffusion modules (lower-level MDS in an example to be described later). That is, in the nested SPN structure of this embodiment, lower-level SPN structures (two stages of SPN structures in an example to be described later) are recursively embedded in S-box portions of the normal SPN structure.

According to such nested SPN structure, the branch number can be hierarchically guaranteed (hierarchy of the branch number), and the lower limit of the number of active S-boxes can also be easily guaranteed. In the nested SPN structure, strength evaluation can be easily made owing to its simple structure.

In FIG. 1, local, lower-level diffusions are expressed by four parallel linear transformation modules 2. However, the number of parallel modules is not limited to four, but other numbers of parallel modules may be used. Also, the numbers of bits of four parallel nonlinear transformation modules are equal to each other. However, the present invention is not limited to such specific number of bits, and a plurality of nonlinear transformation modules two having different numbers of bits may be combined. In this case, all nonlinear transformation modules may have different bit lengths, or some lower-level diffusions may have the same bit length. Also, one type of diffusion module 3 is used. Alternatively, two or more different types of diffusion modules 3 may be used. For example, every other diffusion module 3 over the block width may be replaced by two nonlinear transformation modules. Furthermore, in addition to the method that adopts the repetitive structure of identical arrangements, only some arrangements may be replaced.

Moreover, all the nonlinear transformation modules 2 may have the same arrangement or may include different arrangements. The same applies to the diffusion module, nonlinear transformation modules 4, and diffusion module 5. For example, the first input stage and the last output stage may have internal arrangements different from those of other intermediate stages. This embodiment adopts the nested structure of two layers, but may use a nested structure of three or more layers (in case of three layers, each nonlinear transformation module 4 further has an SPN structure). For example, nonlinear transformation modules 2 may have different hierarchical structures. In addition, other variations are available.

This embodiment will be explained below taking 128-bit block encryption scheme equivalent to AES that uses 8-bit S-boxes as an example.

Strength evaluation of block encryption scheme will be explained below.

As an important measure for estimating the encryption strength of a given function f, the maximum differential probability/maximum linear probability is known.

A maximum differential probability $dp^f$ and maximum linear probability $lp^f$ with respect to a function f(x) are respectively given by:

$$dp^f \equiv \Delta x \stackrel{max}{\neq} 0, \Delta y \left| \frac{\#\{x | f(x) \oplus f(x) \oplus \Delta x) = \Delta y\}}{2^n} \right|$$

$$lp^f \equiv \Gamma x, \stackrel{max}{\Gamma y}, \neq 0 \left| 2\frac{\#\{x | x \cdot \Gamma x = \Gamma y\}}{2^n} - 1 \right|$$

where $\Delta x$ is the difference of input x, $\Gamma x$ is the mask value of x, and $\Delta y$ is the difference of output y.

In general, it is hard to accurately obtain the maximum differential probability $dp^f$ and maximum linear probability $lp^f$. Hence, security is evaluated here using a maximum differential characteristic probability $DP^f$ and maximum linear characteristic probability $LP^f$ which are approximate values for the maximum differential probability $dp^f$ and maximum linear probability $lp^f$.

In this embodiment, the nested SPN structure is used as an encryption function. The characteristics of an SPS structure as the basic structure of the nested SPN structure will be explained below. Note that SPS indicates a three-layered structure of S-box and diffusion layers S and P like S-P-S. The SPS structure is regarded as the two-stage SPN structure.

In the SPS structure, if θ(x) represents the output from the diffusion layer in response to input x, the branch number B with respect to differential cryptanalysis is defined by (see reference [1], reference [6], Hideo Shimizu & Toshinobu Kaneko, "Diffusion Layer of Common Key Cipher," SCIS 99-72, 1999):

$$B \equiv \min_{\Delta x \neq 0}(w(\Delta x) + w(\theta(\Delta x)))$$

where w( ) is the Hamming distance using the bit length of an S-box as a code length. S-boxes connected to nonzero input/output differences will be referred to as active S-boxes.

A structure obtained by connecting S-boxes to the input and output of a diffusion layer will be referred to as an SPS structure. If S-boxes are bijections, and at least one input bit to the SPS structure has nonzero difference, the number of active S-boxes is equal to or larger than the branch number (i.e., equal to or larger than B) according to the definition of the branch number. If $p_S$ represents the maximum differential probability of S-boxes, the maximum differential characteristic probability of the SPS structure does not exceed an upper limit value $p_S^B$.

When M parallel S-boxes are used as S layers of the SPS structure, the branch number of diffusion layers that couple them is equal to or smaller than (M+1), and a linear transform in which the branch number satisfies (M+1) is called an MDS (Maximum Distance Separable) matrix.

If the diffusion layers form an MDS matrix, the maximum differential characteristic probability of the SPS structure does not exceed an upper limit value $P_S^{M+1}$ [reference 1]. Likewise, if $q_S$ represents the maximum linear probability of S-boxes, the maximum linear characteristic probability of the SPS structure does not exceed $q_S^{M+1}$.

If a two-stage SPN structure is used as an S-box of a higher-level SPN structure, it is called an extended S-box (lower-level structure). Assume that $M_1$ parallel S-boxes are used, and $B_1$ represents the branch number of diffusion layers in the extended S-box. Given $M_2$ parallel two-stage SPN structures (higher-level structure) for extended S-boxes in which $B_2$ represents the branch number of the diffusion layers, the number of active S-boxes in the higher-level structure does not become smaller than a lower limit value $B_1 \times B_2$. This nature is called hierarchy of the branch number.

If both two types of higher-level and lower-level diffusion layers form MDS matrices, the number of active S-boxes does not become smaller than $(M_1+1) \times (M_2+1)$. In this way, the upper limits of $DP^f$ and $LP^f$ of the nested SPN structure can be suppressed.

Figure 2:
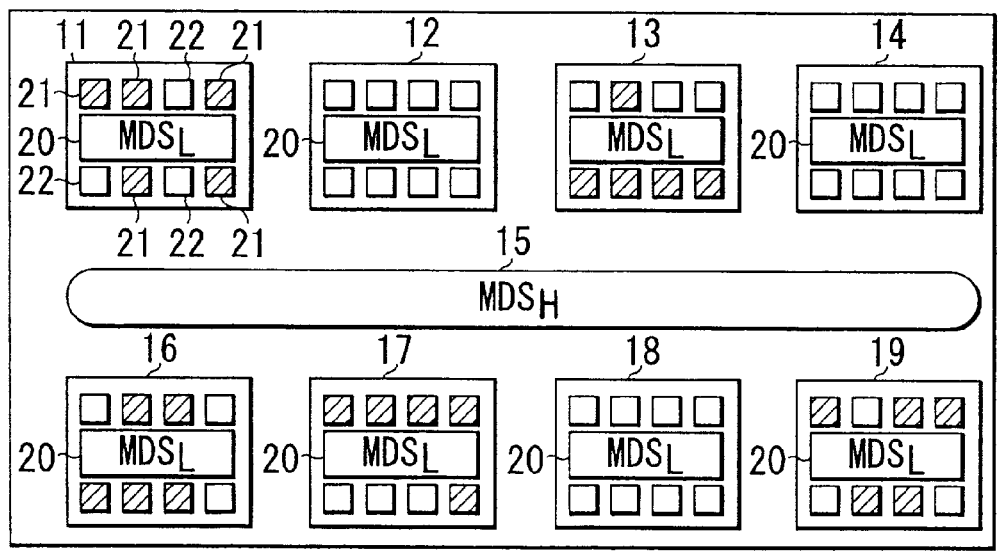
FIG. 2 is a view for explaining an encryption strength.

FIG. 2 shows an example of the two-stage SPN structure when $M_1=M_2=4$. Reference numeral 15 denotes a diffusion part using a higher-level MDS matrix (to be described later); 11 to 14, extended S-boxes at the input side of the diffusion part; and 16 to 19, extended S-boxes at the output side of the diffusion part. In each extended S-box, reference numeral 20 denotes a diffusion part using a lower-level MDS (to be described later). Smallest rectangles 21 and 22 in FIG. 2 respectively indicate input- and output-side S-boxes.

Figure 22:
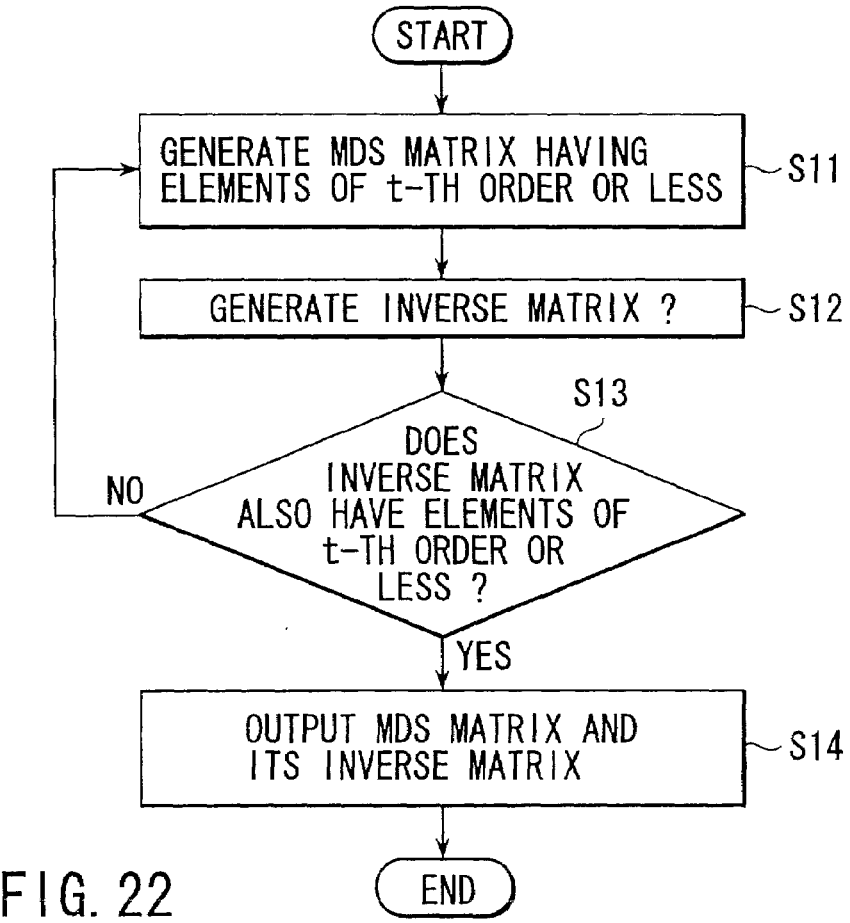
FIG. 22 is a flow chart showing another example of the MDS matrix generation processing sequence.

In FIG. 2, active S-boxes are indicated by hatching (see 21 in FIG. 2), and blank S-boxes indicate zero difference (see 22 in FIG. 22). The extended S-boxes 11, 13, 16, 17, and 19 indicated by bold lines are active extended S-boxes, and other extended S-boxes 12, 14, and 18 indicate zero difference. As can be seen from FIG. 2, the number of active S-boxes in four stage is 25 or more.

As described above, in encryption scheme of this embodiment, 25 (=5×5) or more active S-boxes can be guaranteed by two stages. The maximum differential probability of each S-box is given by:

$$p_S = 6/256 2$$

The differential characteristic probability in two stages is given by:

$$p_S^{25} = 2^{-135.4} << 2^{-128}$$

Hence, differential cryptanalysis is not effective.

Likewise, the linear characteristic probability is given by:

$$q_S = 22/256$$

$$q_S^{25} = 2^{-88.5} << 2^{-64}$$

Hence, linear cryptanalysis is not effective.

Note that the SQUARE attack applied to conventional SQUARE/Rijndael encryption scheme exploits the characteristics in which when all $2^8$ different patterns are input to one byte in a stage while fixing other inputs, all $2^8$ different patterns appear in respective output bytes after two stages. However, the encryption scheme of this example makes simple application of that attack difficult by improving extendibility among S-boxes by the way the higher-level MDS (to be described later) is taken.

This embodiment will be described in detail below using an example of nested encryption scheme.

An example of the arrangement of this embodiment will be described.

Figure 3:
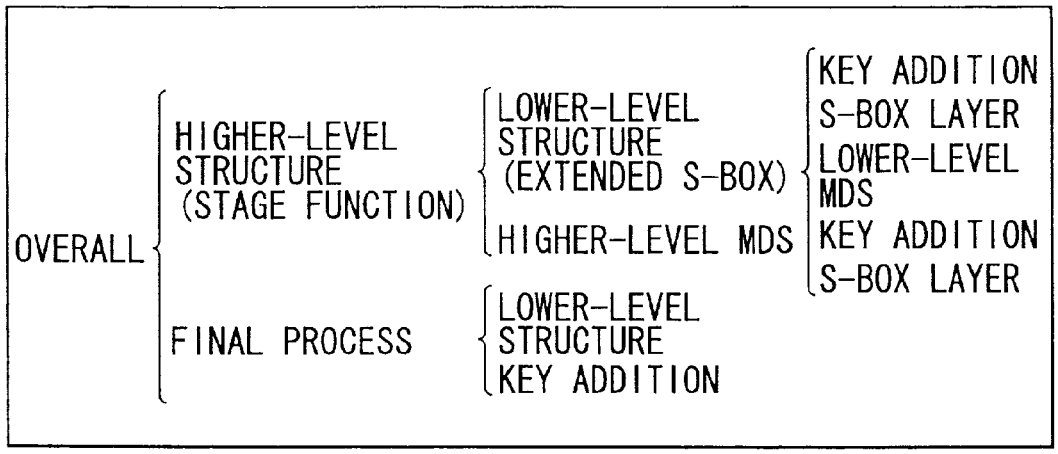
FIG. 3 is a view showing an example of the hierarchical structure of a data randomizing part of nested encryption.

FIG. 3 shows an example of the hierarchical structure of the data randomizing part of nested encryption scheme of this embodiment.

The block length takes 128 bits as an example (of course, the present invention can be practiced for other block lengths). The key length takes 256 bits as an example (of course, the present invention can be practiced for other block lengths). A case wherein the key length=128 bits or 192 bits when the block length=128 bits will be described later.

When a pair of a plurality of parallel extended S-boxes and a higher-level MDS (the final stage does not include any higher-level MDS, as will be described later) is counted as one stage, R represents the number of stages, and R=8 is used in an example. Note that the number of stages is basically not particularly limited. However, the actual number of stages can be appropriately set in consideration of security, computer resources, and the like, and it is more effective to set six or more stages, and more preferably, eight or more stages.

In encryption of this embodiment, since a stage function includes two S-box layers, one stage corresponds to two stages in a normal structure. As for a higher-level MDS in the stage structure, some implementations based on different Galois fields will be explained (strength priority and speed priority examples will be described).

Figure 4:
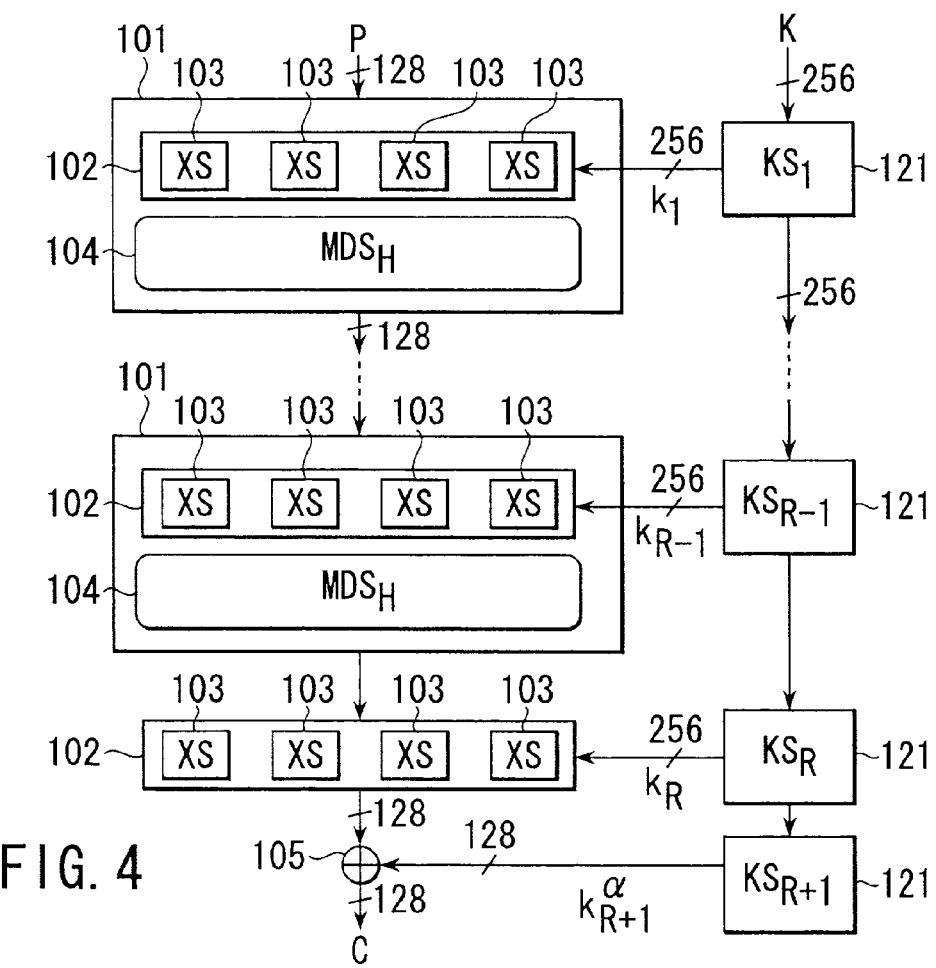
FIG. 4 is a block diagram showing an example of the arrangement of an encryption apparatus.

FIG. 4 shows an example of the arrangement of an encryption apparatus according to this embodiment.

Reference numeral 101 denotes a processing unit (stage function) of each stage; 104, a higher-level MDS diffusion layer; 102, an extended S-box layer; and 103, individual extended S-boxes. Reference numeral 105 denotes an EX-OR unit. Reference numeral 121 denotes one stage of a key scheduling part (details will be described later). Reference symbol P denotes 128-bit plaintext as an input; and C, 128-bit ciphertext as an output.

The stage function 101 has a structure in which four parallel 32-bit processing subblocks (extended S-boxes) 103 each consisting of a two-stage SPN structure are juxtaposed, and their outputs are coupled by the MDS diffusion layer 104. The overall basic structure is defined by repetitions of this stage function 101.

In the example of FIG. 4, to attain symmetric encryption and decryption processes, the final stage is constructed by only an extended S-box layer 102 and a key adder 105.

Since two stages of SPN structures are embedded in one stage of the stage function 101, and key addition is made at the end of the process, the bit length of an extended key is $2 \times 128 \times R + 128 = 128(2R+1)$. When R=8, the bit length is 128×17 bits.

An S-box will be explained below.

Encryption of this example uses an 8-bit S-box defined by an input/output table.

Figures 5, 6:
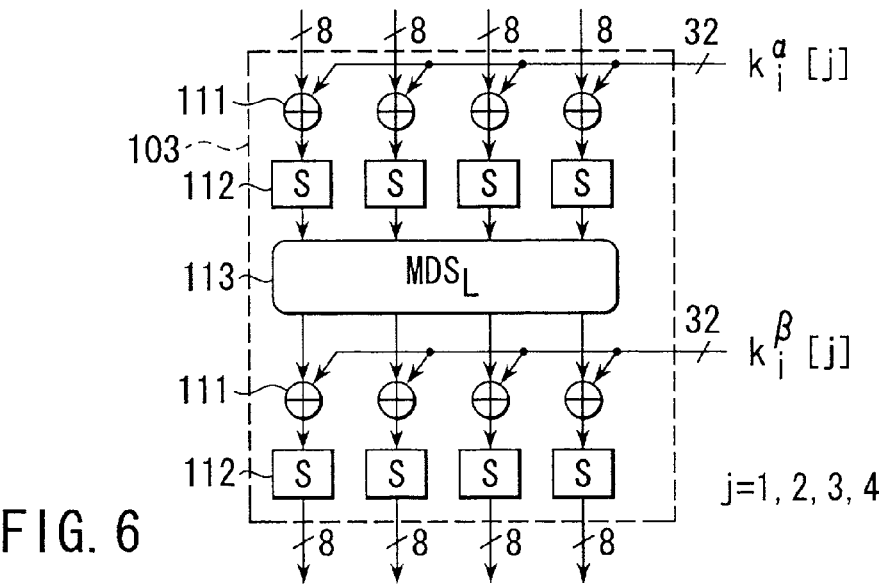
FIG. 5 shows an example of an S-box.
FIG. 6 shows an example of the internal arrangement of an extended S-box.

FIG. 5 shows an example of the input/output table of the 8-bit S-box. In FIG. 5, sequence elements are expressed by hexadecimal notation.

In the table of FIG. 5, the uppermost left value "72" corresponds to s[0]; its right neighboring value "AA" to s[1]; the right end value "9F" of that line to s[15]; the left end value "69" of the next line to s[16]; its right neighboring value "6A" to s[17]; and so forth. The lowermost right value "57" corresponds to s[255].

The characteristics of the S-box exemplified in FIG. 5 are as follows.

maximum differential probability: 6/256 (theoretical minimum value=4/256)

maximum linear probability: 22/256 (theoretical minimum value=16/256)

algebraic order: 7-th order (maximum value of bijection function)

Note that the S-box may use an arithmetic process in place of the input/output table.

Each extended S-box (also called a lower-level structure) will be explained below.

FIG. 6 shows an example of the internal arrangement of the extended S-box 103. In this example, two sets of four parallel 8-bit S-boxes 112 (see FIG. 5) form a two-stage SPN structure to sandwich a diffusion layer 113 therebetween. This structure should be called an SPS structure, but is regarded as a special two-stage SPN structure from which the diffusion layer of the second stage is omitted. A key adder 111 is provided immediately preceding to each S-box 112. The diffusion layer 113 in the extended S-box uses an MDS matrix, which is called a lower-level MDS, and is expressed by $MDS_L$.

Figure 7:
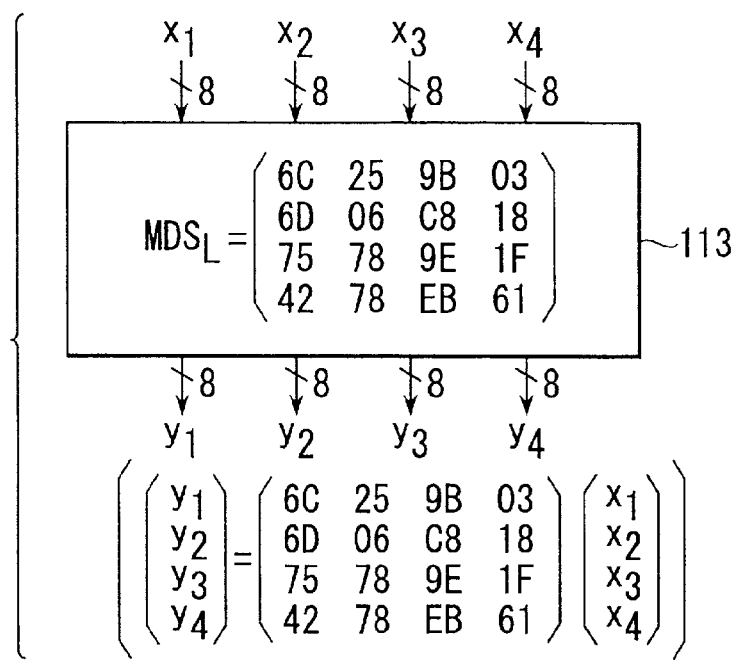
FIG. 7 shows an example of a lower-level MDS.

FIG. 7 shows an example of the $MDS_L$ matrix used in encryption of this embodiment. In FIG. 7, matrix elements are expressed in hexadecimal notation. Note that S-box inputs and outputs, and matrix elements are considered as elements of Galois field $GF(2^8)$ upon multiplication. A primitive polynomial in case of this example is $x^8+x^6+x^5+x+1$.

A higher-level structure as a stage function of encryption of this example will be described below.

Figure 8:
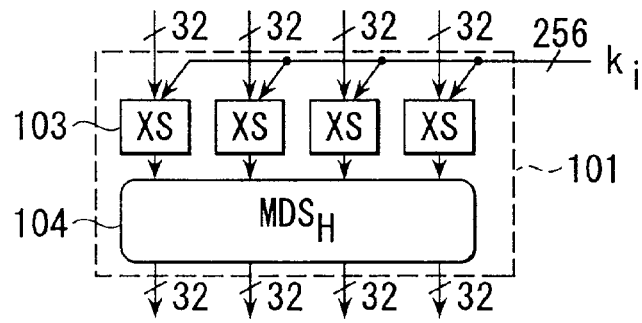
FIG. 8 shows an example of the structure of one stage of the data randomizing part.

FIG. 8 shows an example of the arrangement of one-stage portion 101 of the randomizing part. The higher-level structure 101 as a stage function of encryption of this example is constructed by coupling four parallel 32-bit extended S-boxes 103 (see FIG. 6) by a diffusion layer 104 of an MDS matrix. The diffusion layer 104 in the higher-level structure 101 as a stage function uses an MDS matrix, which is called a higher-level MDS and is expressed by $MDS_H$. Note that the MDS matrix in this case means that the branch number in consideration of the extended S-box is 5.

The simplest implementation of a higher-level MDS is to use the 32-bit wide output of an extended S-box as elements of $GF(2^{32})$. Although this technique readily warrants high strength, it is generally difficult to implement or to attain high-speed processing. In this case, preferably some constraints are applied to the higher-level MDS matrix.

The four parallel MDS matrices can be sufficiently configured by the 4-bit width, and can be implemented using arithmetic operations over $GF(2^4)$. A cyclic MDS allows efficient calculations.

In practice, intermediate configurations using $GF(2^8)$ and $GF(2^{16})$ are available.

A higher-level MDS using $GF(2^{32})$ will be described below.

In this case, the inputs and outputs of an extended S-box are considered as elements of $GF(2^{32})$ to design a higher-level MDS. This is a natural design method in the SPN structure. However, it is not practical with the 32-bit width to implement using a multiplication table. Also, implementation by means of calculations cannot achieve high-speed processing since a normal MDS matrix requires a large calculation volume. The calculation volume increases since the process upon carry-up in multiplication over the Galois field is heavy. To suppress the calculation volume, a method of configuring a higher-level MDS matrix using elements in which "1"s appear in only lower 5 bits of 32 bits (bits other than the lower 5 bits are fixed to zero) in bit expression is available. Using a matrix that satisfies such condition, the shift-up process can be processed by table lookup using upper 4 bits as an input.

Figure 9:
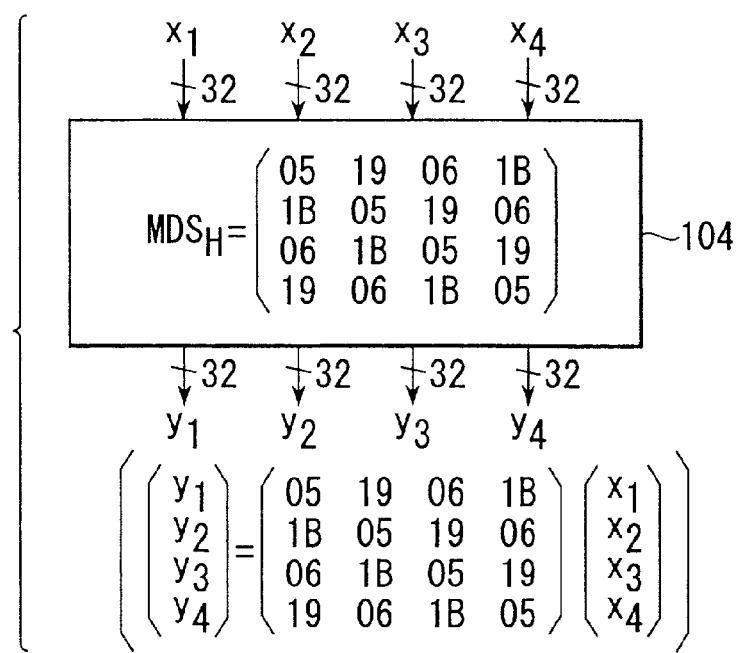
FIG. 9 shows an example of a higher-level MDS.

FIG. 9 shows an example of the higher-level MDS matrix. A primitive polynomial in case of this example is $x^{32}+x^{28}+x^{27}+x+1$.

A higher-level MDS using $GF(2^4)$ will be explained.

Figure 10:
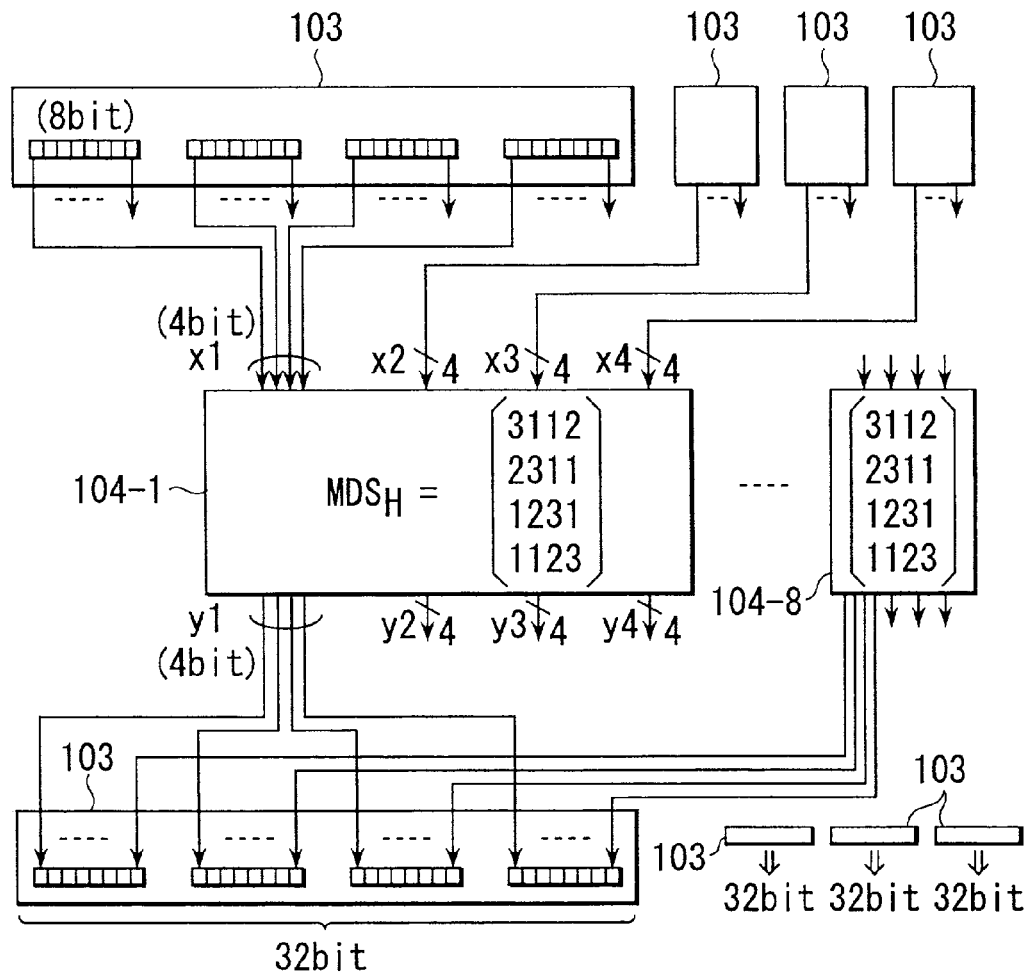
FIG. 10 shows another example of the higher-level MDS.

FIG. 10 shows an example of the MDS matrix in this case. A primitive polynomial in case of this example is $x^4+x+1$.

In this case, 1-bit data at corresponding positions (the most significant bits are exemplified in FIG. 10) of the outputs, i.e., 8-bit data of four S-boxes in one extended S-box 103 form 4-bit data per set, and four sets of 4-bit data from one extended S-box 103 are considered as elements of $GF(2^4)$.

A diffusion layer 104 between two stages of four parallel extended S-box layers 103 uses 4 (rows)×4 (columns) MDS matrices (e.g., 104-1 in case of the most significant bits in FIG. 10) at corresponding positions of 8-bit data.

The four sets of 4-bit data as outputs are connected to corresponding positions of corresponding source 8-bit data.

Eight MDS matrices (104-1 to 104-8) are prepared as higher-level MDS matrices in correspondence with the bit width of S-boxes.

These 4 (rows)×4 (columns) MDS matrices guarantee the branch number=5. Since the individual MDS matrices are connected to different bit positions in S-boxes, the branch number=5 is guaranteed as a whole.

By table lookup in units of S-box outputs at corresponding positions of extended S-boxes (also by arithmetic operations), efficient implementation that simultaneously processes eight MDS matrices can be made.

If cyclic MDS matrices are used, an efficient process that combines EX-ORing in units of 32 bits and bit rotations in units of 8 bits can be performed.

Based on the same idea as described above, processing may be performed in units of 2 bits at corresponding positions of 8-bit data, and four 4 (rows)×4 (columns) MDS matrices ($GF(2^8)$) having 8-bit elements may be prepared as higher-level MDS matrices. On the other hand, processing may be performed in units of 4 bits at corresponding positions of 8-bit data, and two 4 (rows)×4 (columns) MDS matrices ($GF(2^{16})$) having 16-bit elements may be prepared as higher-level MDS matrices.

In the above description, bits at corresponding positions are extracted and processed. Alternatively, bits at different positions may be (exclusively) extracted and processed. In FIG. 10, four parallel extended S-boxes 103 are used, but the number of parallel extended S-boxes is not limited to such specific value. Also, all the extended S-boxes need not have the same internal arrangement, and some of them may have different arrangements. All the higher-level MDS matrices need not have the same internal arrangement, and some of them may have different arrangements. The same applies to lower-level MDS matrices and the input/output tables of S-boxes. For example, the first input stage and last output stage may have internal arrangements different from those of the intermediate stages. In addition, various other variations are available.

The key scheduling part (key generator) will be explained below.

Figure 11:
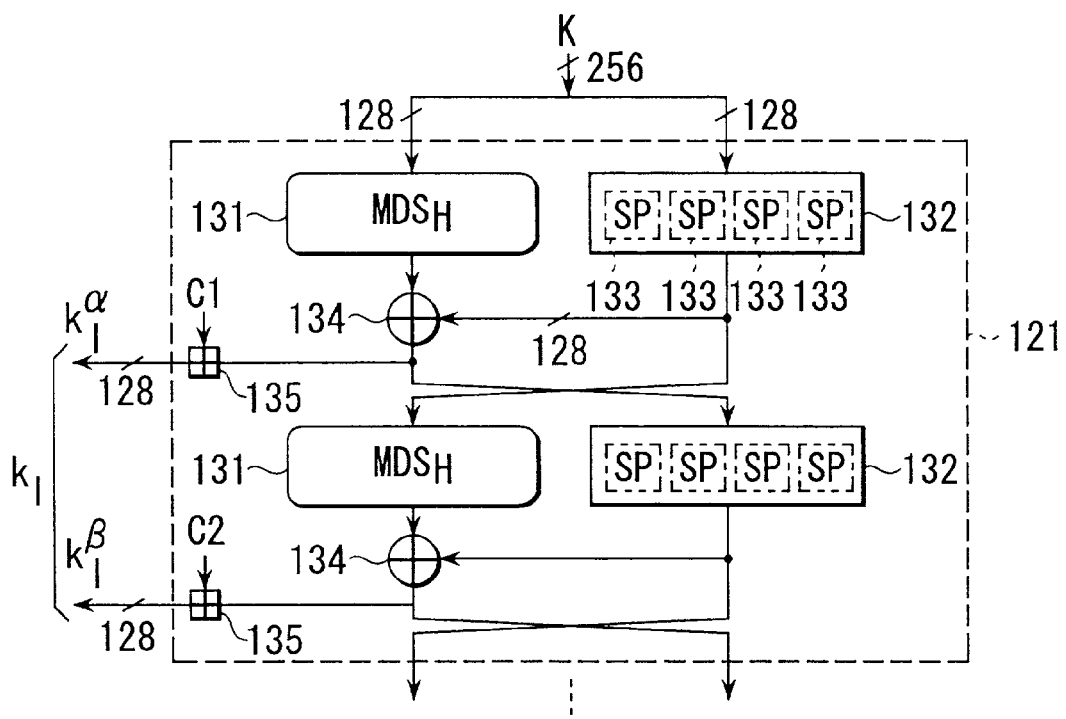
FIG. 11 is a block diagram showing an example of the arrangement of a key scheduling part.

FIG. 11 shows an example of the arrangement of the key scheduling part. Reference numeral 121 denotes a portion corresponding to one stage of the stage function of the data diffusion part; 131, a linear diffusion layer (in this example, a diffusion layer using a higher-level MDS matrix); 132, a nonlinear transformation layer (in this example, four parallel SP layers (S-box layers/diffusion layers) 133); 134, an EX-OR unit; and 135, a remainder adder. Although not shown in FIG. 11, the arrangement of the portion 121 is repeated in correspondence with the number of stages. When the arrangement unit that outputs a 128-bit key is defined as one stage of the key scheduling part, the number of key scheduling part is (2R+1) (=17 when R=8).

In the example shown in FIG. 11, 128 bits as the left half of the output of each stage of a 256-bit modified Feistel repetitive process are extracted, and a stage number dependent constant $C_i$ is added thereto as a remainder to obtain an extended key.

When the key length is 256 bits, for example, the upper 128 bits are input to the linear diffusion layer 131 of the first stage, and the lower 128 bits are input to the nonlinear transformation layer 132. When the key length is 128 bits, for example, the 128 bits are input to the linear diffusion layer 131 of the first stage, and also to the nonlinear transformation layer 132. When the key length is 192 bits (=64 bits×3), for example, 128 bits obtained by coupling the upper 64 bits and the intermediate 64 bits are input to the linear diffusion layer 131 of the first stage, and 128 bits obtained by coupling the upper 64 bits and the lower 64 bits are input to the nonlinear transformation layer 132.

Figure 12:
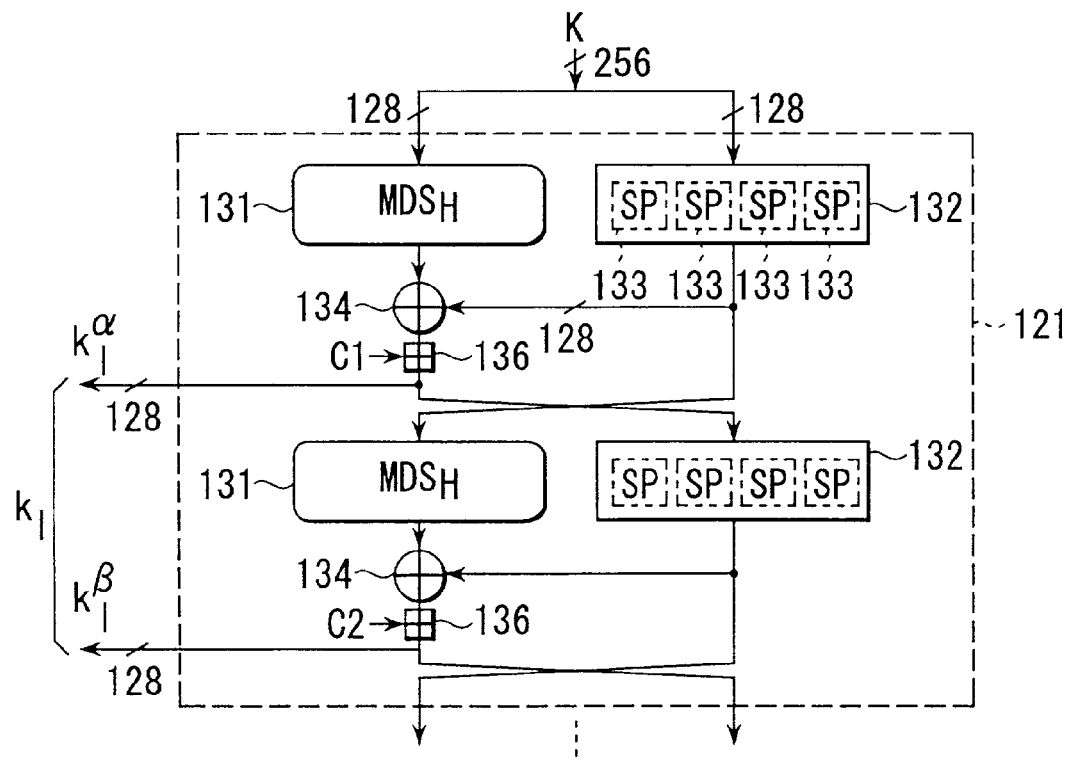
FIG. 12 is a block diagram showing another example of the arrangement of the key scheduling part.

Note that the location of the remainder adder 136 that adds the stage number dependent constant $C_i$ as a remainder may have various variations, as shown in FIG. 12.

FIG. 13 shows an example of the arrangement of each SP layer 133 of the nonlinear transformation layer 132 in FIGS. 11 and 12. Reference numeral 141 denotes S-boxes; and 142, a lower-level MDS for receiving the outputs from the four parallel S-boxes.

Note that this S-box may be either the same as or different from that (FIG. 5) for the encryption processing shown in FIG. 4. The same applies to the lower-level MDS. The S-boxes and lower-level MDS may have different arrangements in units of stages of the key scheduling part.

FIG. 14 shows another example of the arrangement of each SP layer 133 of the nonlinear transformation layer 132 in FIGS. 11 and 12. In this example, EX-OR units 143 are added to the arrangement shown in FIG. 13.

Furthermore, a constant to be EX-ORed with the input to each S-box may be a stage number dependent constant in FIG. 14.

An example of a method of generating different constants $C_i$ in individual stages will be explained below.

The 128-bit additive constant $C_i$ of the key scheduling part in FIGS. 11 and 12 are described by a combination of four bit constants ($H_0$, $H_1$, $H_2$, $H_3$). Examples of 32-bit constants $H_i$ are:

$$H_0 = (5A827999)_H = \lfloor (\sqrt{2}/4 \times 2^{32}) \rfloor$$

$$H_1 = (6ED9EBA1)_H = \lfloor (\sqrt{3}/4 \times 2^{32}) \rfloor$$

$$H_2 = (8F1BBCDC)_H = \lfloor (\sqrt{5}/4 \times 2^{32}) \rfloor$$

$$H_3 = (CA62C1D6)_H = \lfloor (\sqrt{10}/4 \times 2^{32}) \rfloor$$

where $\lfloor x \rfloor$ is a floor function and indicates an largest integer which is not larger than x.

A combination of additive constants $C_i$ is described by $C_i = (C_{i0}, C_{i1}, C_{i2}, C_{i3})$. In order to allow easy generation of different 128-bit constants $C_i$ in individual stages, 8-bit LFSRs are used to determine a combination of $H_i$ which form $C_i$. For example, $(1D)_H$ is used in the primitive polynomial of each LFSR, and $(8B)_H$ is used in the initial state of each LFSR. A bit sequence generated using the LFSRs is read out in units of 2 bits to determine a 32-bit constant Hi used as the constant.

FIG. 15 shows an example of an additive constant table determined using the LFSRs by the aforementioned method.

Note that the initial state of each LFSR may be variable or fixed. In the former case, the initial state of each LFSR partially defines the key. In the latter case, only a decryption apparatus having the same initial state of each LFSR as that in the encryption apparatus can decrypt the ciphertext.

According to the aforementioned key scheduling part, in each SP layer 133, when 1 bit of the input has changed, the S-boxes 141 can spread that change to 8 bits, and the lower-level MDS 142 can spread the change to 32 bits. Furthermore, in the linear diffusion layer, since the higher-level MDS 131 largely diffuses the output from the nonlinear transformation layer of the previous state, a 1-bit difference are propagated to the 128-bit width.

Therefore, according to the key scheduling part, the respective stages easily generates, i.e., diffuse random keys. Since different constants are used in units of stages, keys rarely match among stages (keys hardly match).

Note that the key scheduling part may have another arrangement.

An efficient linear diffusion device used in the diffusion part of block encryption scheme data having a large block length will be explained below.

Figure 16:
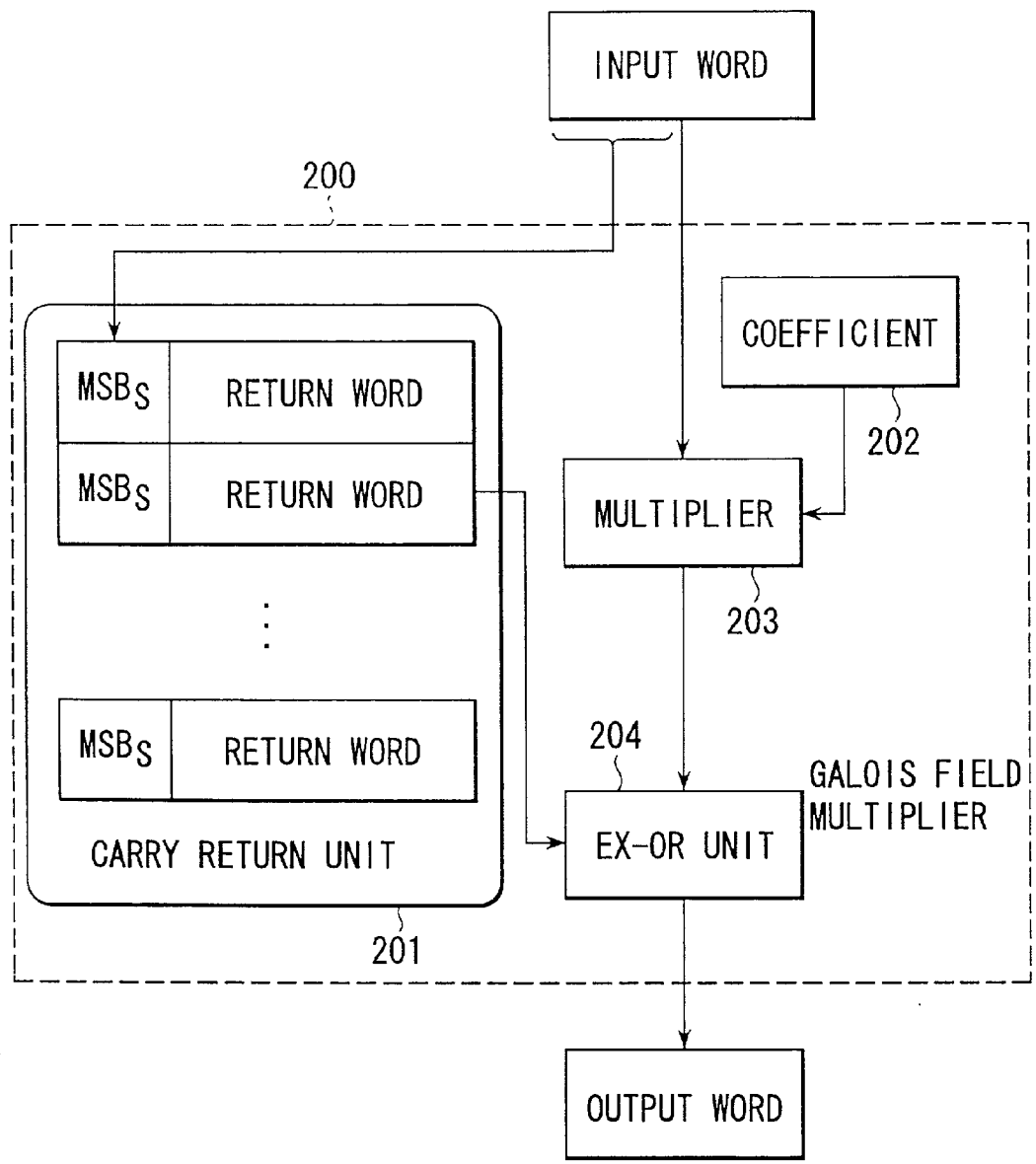
FIG. 16 is a block diagram showing an example of the arrangement of a Galois field multiplier.

FIG. 16 shows an example of the arrangement of a Galois field multiplier as a basic component of the linear diffusion device of this embodiment. This linear diffusion device are used to calculate the product of one input and one element of the higher-level MDS matrix in the aforementioned higher-level MDS (see 104 in FIGS. 9 and 4, 131 in FIGS. 11 and 12) using $GF(2^{32})$ or $GF(2^{16})$.

As shown in FIG. 16, the Galois field multiplier comprises a coefficient storage unit 202, multiplier 203, carry return unit 201, and EX-OR unit 204.

The coefficient storage unit 202 stores a coefficient, i.e., a multiplier of multiplication (for example, one element of the higher-level MDS matrix in FIG. 9).

The multiplier 203 multiplies the input word and coefficient when they are binary values.

When the coefficient of the coefficient storage unit 202 is a power of 2 like 1, 2, 4, . . . , a calculation using a normal multiplier are made. On the other hand, if the multiplier is a specific one that does not propagate any carry, a calculation are made when the coefficient of the coefficient storage unit 202 is an arbitrary value.

The carry return unit 201 searches for a value (return word) to be added by the EX-OR unit 204 to feed back a carry as a result of multiplication to multiplication over the Galois field.

The EX-OR unit 204 exclusively ORs the output from the multiplier 203 and the output bits of the carry return unit 201.

The function of the Galois field multiplier 200 is to calculate a product a×b of input word "a" as an element of an extension field $GF(2^k)$ of a Galois field GF(2), and a coefficient "b" as another element of that Galois field as an output word.

The product in the Galois field will be described below.

In the following description, i and j upon calculating sum totals in $\Sigma a_i x^i$ and $\Sigma b_j x^j$ range from 0 to k−1, and a description of these ranges will be omitted.

Elements of $GF(2^k)$ are expressed as a (k−1)-th order polynomial $\Sigma a_i x^i$ in a given variable x by polynomial expression. Element "a" is often expressed by arranging its coefficients like $c_{k-1}, c_{k-2}, \ldots, c_0$.

The product of two elements "a"=$\Sigma a_i x^i$ and b=$\Sigma b_i x^i$ is defined by:

$$a \times b = (\Sigma a_i x^i a) \times (\Sigma b_i x^i) \bmod p(x)$$

where p(x) is called a primitive polynomial of $GF(2^k)$, and is a k-th order irreducible monic polynomial. Also, "mod" means that, for example, when k=32 and $p(x)=x^{32}+x^{28}+x^{27}+x+1$ is selected as a primitive polynomial, if the term of $x^{32}$ or factor appears as a product of the polynomial, it is considered as $(x^{28}+x^{27}+x+1)$. Therefore, the product is also a polynomial of order k or less.

In general, upon executing such operation, a multiplier using a multiplication table that searches for a product using a multiplier and multiplicand as tags is often used so as to attain high-speed processing. However, since both the multiplier and multiplicand can assume $2^k$ values, the multiplication table has $2^{2k}$ entries, each having a k-bit size. For this reason, when k becomes large to some extent, the multiplication table has a very large size.

This embodiment is basically similar to that method using the multiplication table, but when coefficients satisfy a given constraint condition, such table are implemented by much smaller storage size.

In this constraint condition, coefficient b is a constant, and only lower order coefficients of given order t or less have nonzero coefficients (coefficients exceeding the t-th order are 0, and coefficients of the t-th order or less are 0 or 1). When given element "a" assumes an arbitrary element, a maximum of a 32-bit carry is generated, but when this constraint condition is satisfied, a t-bit carry at most is generated. The t-bit carry value is determined by the MSB (Most Significant Bits) within the upper t-bit range of multiplier "a".

The difference between multiplication over the Galois field and that considered as a normal polynomial is that when a carry to a coefficient of the 32nd-order or higher is generated as a product of binary values, contribution of that carry must be returned to coefficients of less than the 32nd-order by the primitive polynomial, but the carry return unit 201 has words to be returned in the form of a table in this embodiment.

This return word are determined by coefficient b of (t+1) bits at most, upper t bits of multiplicand "a", and a primitive polynomial. That is, the return word is given by (a[(k−t) ... (k−1)]×b) [(t+1) ... 2t] mod p(x) where a[(k−t) ... (k−1)] extracts terms from the (k−1)-th order to the (k−t)-th order from "a".

That is, the contents of the return word table of the carry return unit 201 are determined in correspondence with elements of the corresponding MDS matrix (see FIG. 9).

The return word table of the carry return unit 201 has $2^t$ entries, each having a k-bit size.

The linear transformation section which is implemented using the aforementioned Galois field multiplier and calculates the linear transforms of data blocks of block encryption scheme will be described below.

Linear transformation using an MDS matrix is known as a kind of linear transformation. The MDS matrix is an n (rows)×n (columns) matrix in which a data block comprises a plurality of (n) words, and when each word has a k-bit length, it is considered as an element of a Galois field $GF(2^k)$, and which linearly maps a set of n elements to a set of n elements, and has all nonzero small matrices. Linear transformation based on the MDS matrix can guarantee the lower limit of the number of nonzero input/output words.

However, in general, a matrix operation over the Galois field $GF(2^k)$ includes several times of multiplication and addition over the $GF(2^k)$, resulting in high calculation cost.

Figure 17:
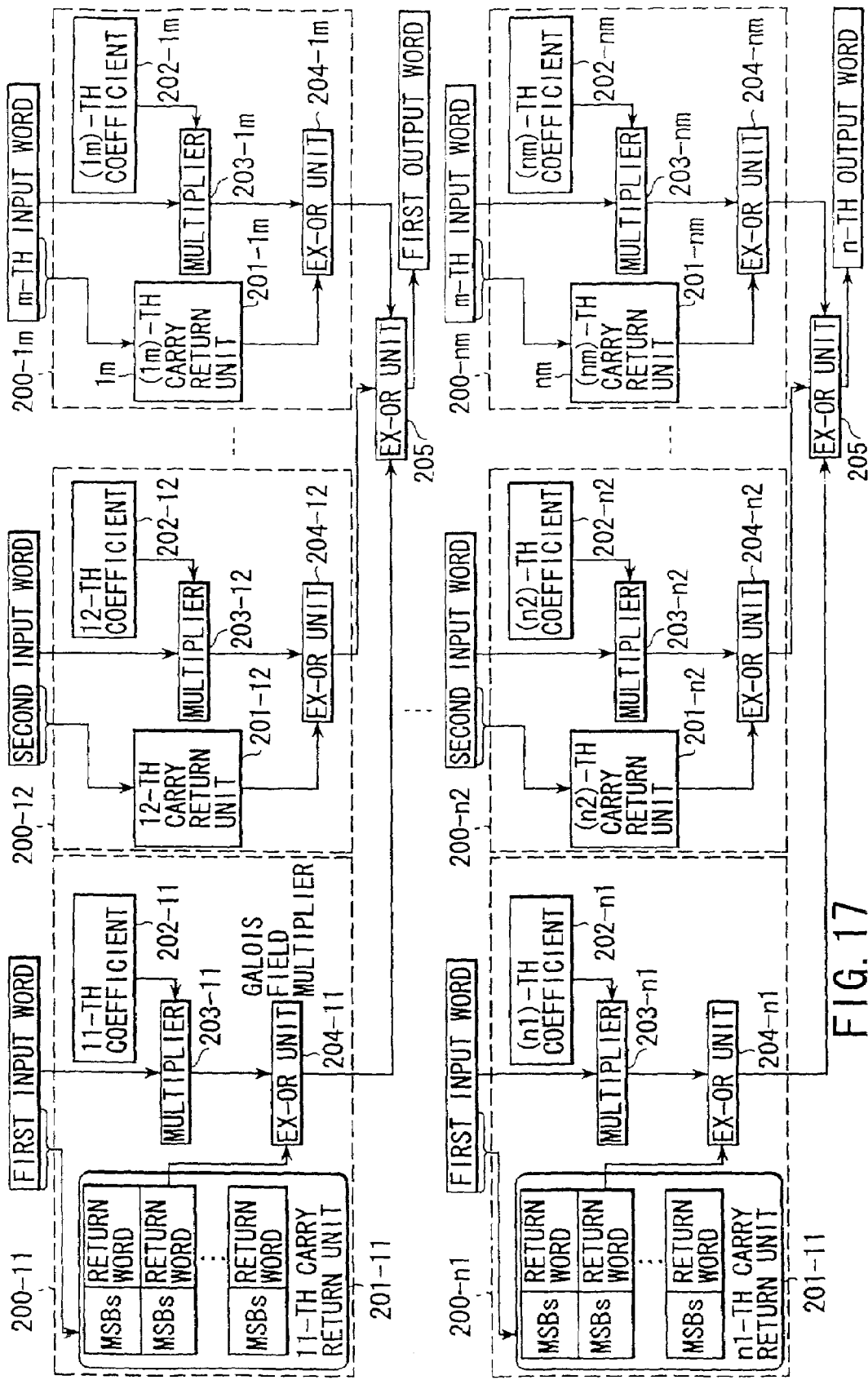
FIG. 17 is a block diagram showing an example of the arrangement of a linear transformation section.

FIG. 17 shows an example of the arrangement of the linear transformation section of this embodiment. This linear transformation section are used in the aforementioned higher-level MDS (104 in FIGS. 9 and 4, 131 in FIGS. 11 and 12) using $GF(2^{32})$ or $GF(2^{16})$.

In the arrangement shown in FIG. 17, the Galois field multipliers shown in FIG. 16 are prepared in a matrix pattern in correspondence with the MDS matrix.

If m=n in FIG. 17, a coefficient of each of $n^2$ Galois field multipliers 200 assumes the same value as the corresponding element of an n (rows)×n (columns) MDS matrix. A device having a coefficient $a_{ij}$ receives the i-th input word.

EX-OR units 205 corresponding to respective output words calculate EX-ORs of output bits of all the Galois field multipliers 200 having coefficients $a_{ij}$ corresponding to given j, and output them as the j-th output words.

Figure 18:
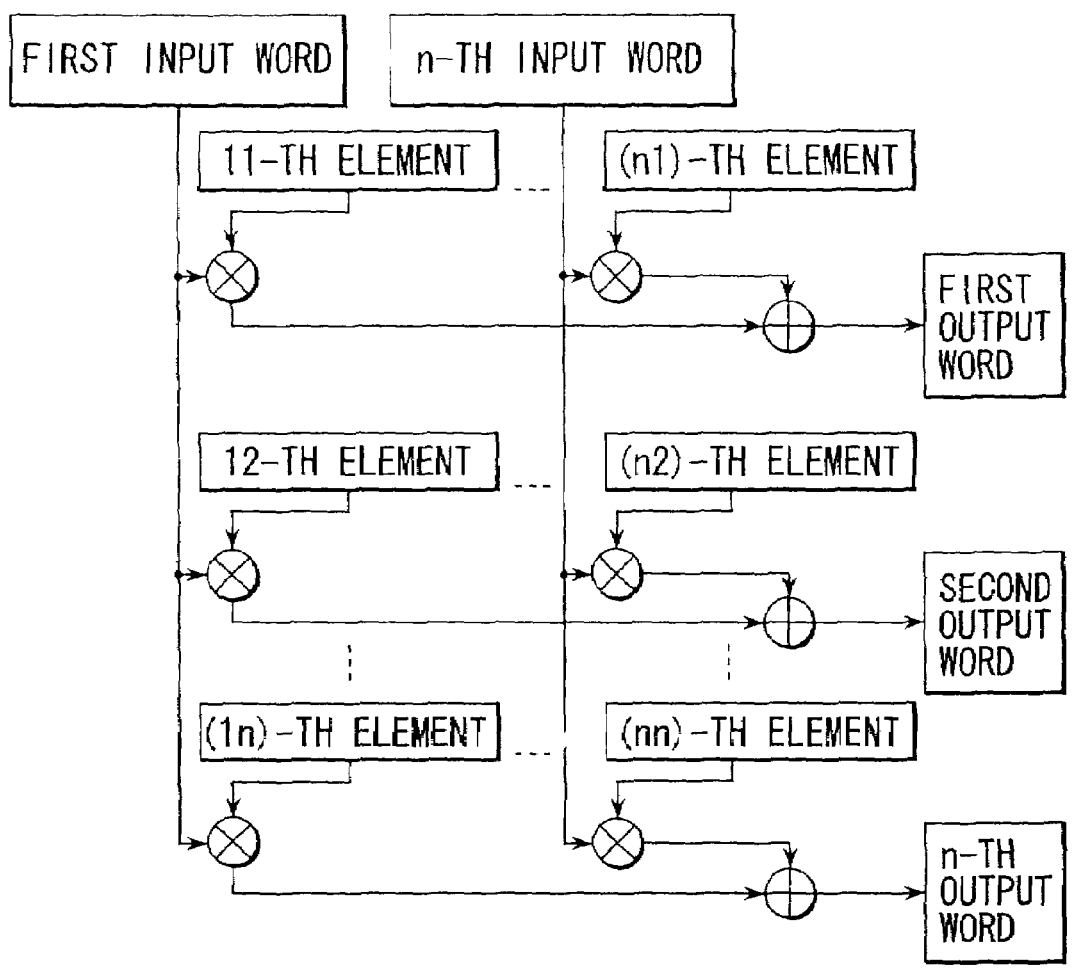
FIG. 18 is a block diagram showing another example of the arrangement of the linear transformation section.

FIG. 18 shows another example of the arrangement of the linear transformation section of this embodiment. According to the linear transformation section of this example, when an MDS matrix that expresses linear transformation is expressed by $(a_{ij})$, only terms of the t-th order or less of each element $a_{ij}$ have nonzero coefficients. Assume that i and j can assume an integer ranging from 0 to n−1. Also, t is a positive value smaller than the extension order k of the Galois field $GF(2^k)$.

In this way, multiplication shown in FIG. 18 are implemented.

Note that the contents of the return word table of the carry return unit 201 are determined in accordance with the corresponding elements of the MDS matrix. Therefore, in the example of the higher-level MDS matrix shown in FIG. 9, only four different return word tables are prepared.

An MDS matrix generation section (or random generation algorithm) for generating an MDS matrix (especially, higher-level MDS) used in the encryption system of the present invention will be explained below.

Figure 19:
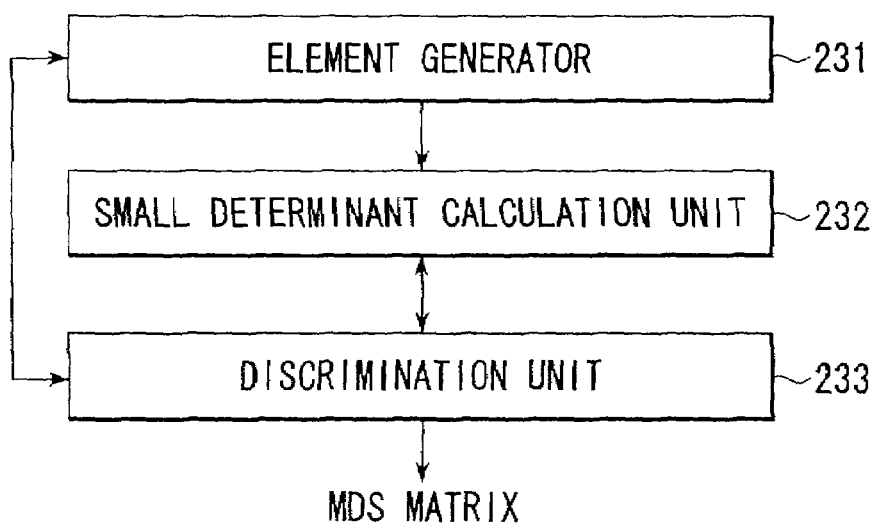
FIG. 19 is a block diagram showing an example of the arrangement of an MDS matrix generation section.

FIG. 19 shows an example of the arrangement of the MDS matrix generation section. As shown in FIG. 19, the MDS matrix generation section comprises an element generator 231, small determinant calculation unit 232, and discrimination unit 233.

Figure 20:
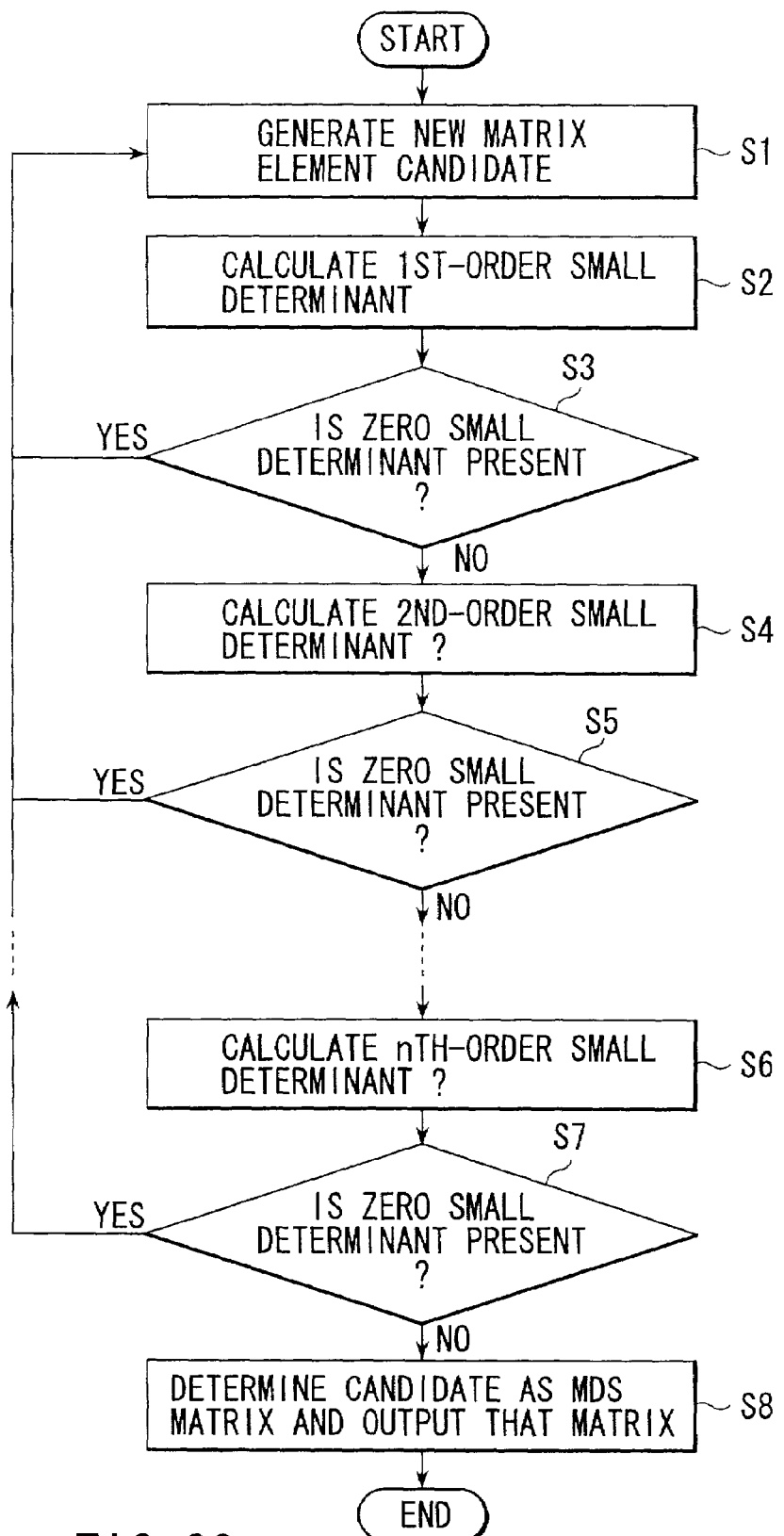
FIG. 20 is a flow chart showing an example of an MDS matrix generation processing sequence.

FIG. 20 shows an example of the sequence in this case.

The element generator 231 randomly generates matrix elements of an n (rows)×n (columns) MDS matrix (step S1). When the aforementioned Galois field multiplier is allowed to be applied, an MDS matrix in which only lower t bits consist of nonzero elements (elements of the t-th order or less) (that is, in this case, the element generator 231 checks if only lower t bits are nonzero) is generated.

In order to generate matrix elements, various methods such as a method of generating and using random numbers, a method of using control variable values of multiple loops, and the like are available.

The small determinant calculation unit 232 calculates 1st-order small determinants of the matrix generated by the element generator 231 (step S2), and the discrimination unit 233 checks if the small determinant calculated by the small determinant calculation unit 232 is nonzero (step S3). If at least one zero 1st-order small determinant is found, the processing is performed again from step S1.

If all 1st-order small determinants are nonzero, 2nd-order small determinants are similarly checked (steps S4 and S5).

The aforementioned process is repeated up to nth-order small determinants (steps S6 and S7), and if it is confirmed that all small determinants from the 1st order to the nth-order are nonzero, that MDS matrix is output (step S8).

When the MDS matrix obtained in step S8 is used in encryption, an MDS matrix used in decryption is given by an inverse matrix of the MDS matrix obtained in step S8 (conversely, when the MDS matrix obtained in step S8 is used in decryption, its inverse matrix is used as an MDS matrix used in encryption).

Note that even if all elements of the MDS matrix obtained in step S8 have only nonzero lower t bits, all elements of its inverse matrix do not always have only nonzero lower t bits.

In the sequence shown in FIG. 20, small determinants are checked in turn from the 1st order to the nth order, but may be checked in other orders, or all or some of these determinants may be parallelly checked.

A method of obtaining MDS matrices so that both the MDS matrix used in encryption and that used in decryption as the inverse matrix of the former matrix satisfy a condition that only lower t bits are nonzero will be explained below.

Figure 21:
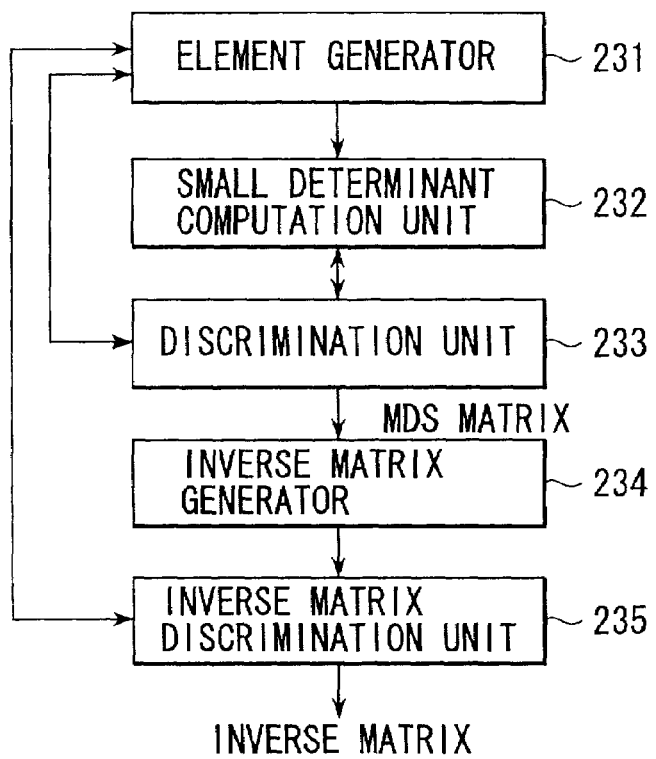
FIG. 21 is a block diagram showing another example of the arrangement of the MDS matrix generation section.

FIG. 21 shows an example of the arrangement of the MDS matrix generation section in this case. As shown in FIG. 21, the MDS matrix generation section comprises the element generator 231, the small determinant calculation unit 232, the discrimination unit 233, an inverse matrix generator 234, and an inverse matrix discrimination unit 235. The element generator 231, small determinant calculation unit 232, and discrimination unit 233 are the same as those in FIG. 19.

FIG. 22 shows an example of the sequence in this case.

As in the above example, the element generator 231, small determinant calculation unit 232, and discrimination unit 233 generate an MDS matrix consisting of elements only lower t bits of which are nonzero (step S11).

The inverse matrix generator 234 generates an inverse matrix of the generated MDS matrix (step S12).

The inverse matrix discrimination unit 235 checks if only lower t bits of each element of the obtained inverse matrix are nonzero.

If only lower t bits of all elements are nonzero (step S13), these MDS matrix and inverse matrix are output (step S14).

If at least one element is found to have nonzero lower t bits (step S13), the processing is performed again from step S11.

When the MDS matrix generated in step S11 is used in encryption, the inverse matrix generated in step S12 is used in decryption (conversely, when the MDS matrix generated in step S11 is used in decryption, the inverse matrix generated in step S12 is used in encryption).

Upon generating an MDS matrix, an MDS matrix in which elements having identical values are not present in identical rows (in an n (rows)×n (columns) MDS matrix, the (i1)-th to (in)-th elements do not include two or more elements having identical values) may be generated. For example, in the examples of the sequences shown in FIGS. 20 and 22, it is determined upon generating an MDS matrix if elements having identical values are present in a single row, and if elements having identical values are found in a single row, the MDS matrix may be generated. Note that elements having identical values may be present in a single row.

Using a linear transformation section that selects an MDS matrix in which elements having identical values are not present in a single row as a linear transformation section of block encryption scheme data, the probability that differential values of input words cancel each other are reduced.

On the other hand, an MDS matrix in which the sum of elements in a single row is not 1 or 0 may be generated. In this case, the same effect are obtained.

A method of improving security by selecting (or optimizing) the combination of S-box and lower-level MDS and, more particularly, a design method of a combination of S-box and lower-level MDS which can guarantee that the maximum differential characteristic probability becomes better than the theoretical worst example, will be described below.

Since MDS guarantees only the branch number B, if p represents the maximum differential probability of S-boxes, the maximum differential characteristic probability is $p^B$ For example, an m (rows)×m (columns) MDS has B=m+1. However, by selecting (optimizing) the combination of S-box and lower-level MDS, a maximum differential characteristic probability of less than $p^B$ are guaranteed by the branch number B. As a result, by combining an MDS with a smaller maximum differential probability than a normal MDS with S-boxes, a synergetic effect are expected, and security are further improved.

As security evaluation schemes of an encryption algorithm, differential cryptanalysis and linear cryptanalysis are known, and they have duality. Paying attention to differential cryptanalysis, the security of S-boxes is specified by the probability that the input and output have differential correlation, and is higher with decreasing probability. In the encryption algorithm, the security are improved as a larger number of S-boxes with a smaller differential probability are combined. As an efficient coupling method of S-boxes, a linear transformation section has been conventionally proposed. The linear transformation section calculates the linear transform of data having a given block length, and is used as a component of an encryption apparatus (and a decryption apparatus). Linear transformation using an MDS matrix is known as a kind of linear transformation.

An MDS matrix defines linear transformation to n words when a data block is made up of a plurality of (n) words, and guarantees (n+1) or more nonzero input/output words. However, since an S-box has a plurality of candidate values such as 6/256, 4/256, 2/256, and the like as a differential probability, an MDS in which each of (n+1) probabilities is 4/256 can assure higher security than an MDS in which each of (n+1) probabilities is 6/256.

Conventionally, the securities of the S-box and MDS are individually evaluated as sole building elements. In this embodiment, an example of a device for verifying the synergism of the S-box and MDS will be described.

Figure 23:
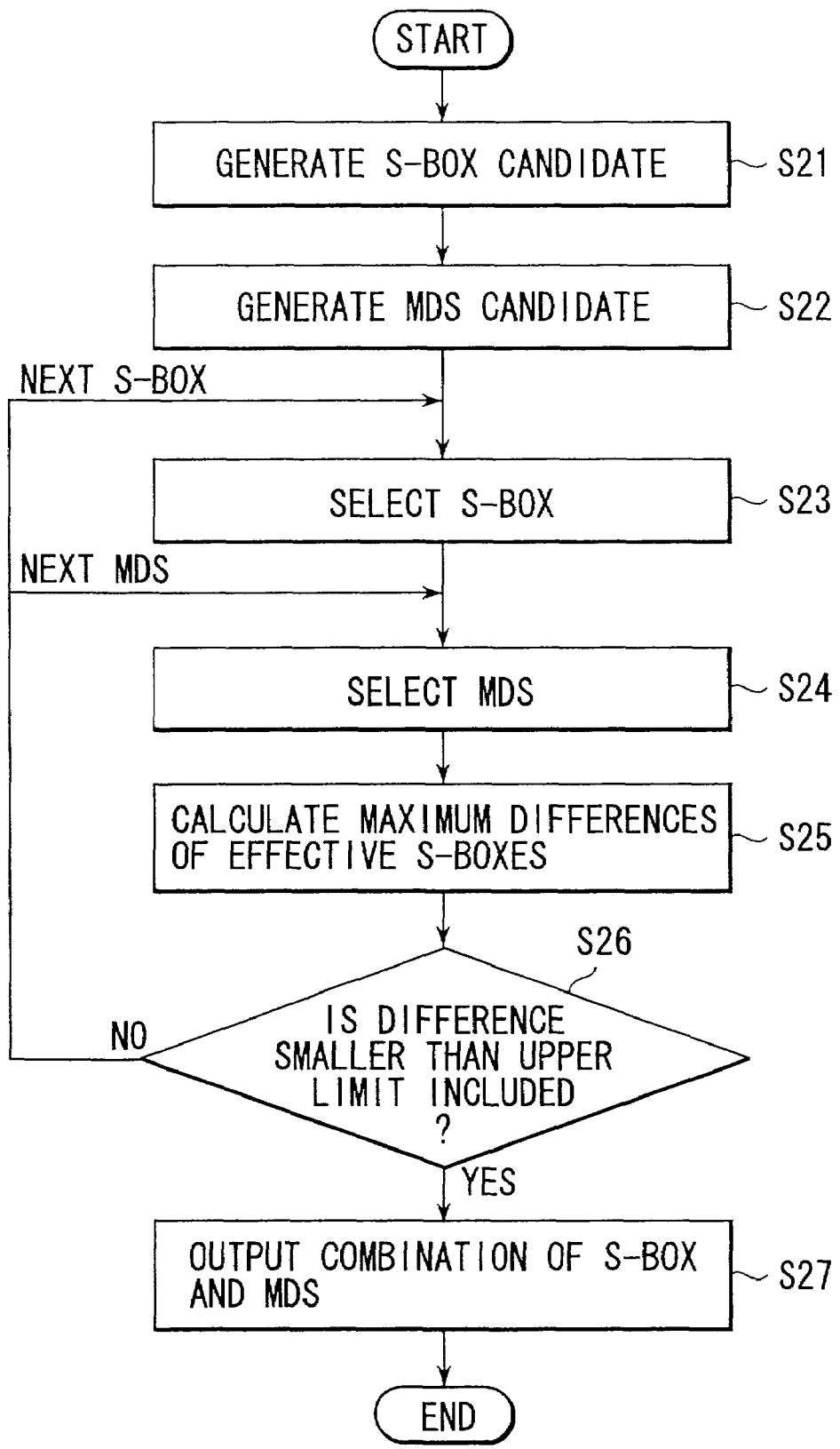
FIG. 23 is a flow chart showing an example of a processing sequence for selecting a combination of an S-box and lower-level MDS.

FIG. 23 shows an example of the processing sequence in this case. This example pays attention to differential cryptanalysis, and shows a process for determining an MDS that can expect synergism with the S-box. Since differential cryptanalysis and linear cryptanalysis have duality, the same effect are obtained for linear cryptanalysis when this process is performed in consideration of the linear probability.

A plurality of S-box candidates and a plurality of lower-level MDS candidates are generated (steps S21 and S22). Note that steps S21 and S22 may be executed in the reverse order, or may be executed parallelly.

One of the S-box candidates is selected (step S23), and one of the lower-level MDS candidates is selected (step S24). Note that steps S23 and S24 may be executed in the reverse order, or may be executed parallelly.

As will be described later, a maximum difference of effective (active) S-boxes is calculated (step S25), and it is determined if a difference (e.g., 4/256) smaller than an upper limit (e.g., 6/256) is included.

If such difference is included (step S26), a combination of the S-box and lower-level MDS at that time is output (step S27).

On the other hand, if no such difference is included (step S26), one or both of the S-box and lower-level MDS is or are reselected to repeat the aforementioned process.

In FIG. 23, a plurality of S-box candidates and a plurality of lower-level MDS candidates are generated initially. Alternatively, candidates other than the first set may be generated when the condition in step S26 is not satisfied and another S-box or MDS must be selected.

The actual processes in steps S25 and S26 are executed as follows.

In the example of the extended S-box 103 in FIG. 6, the following four different types of verifications (a total of 20 different verifications) are made for a combination of S-box and lower-level MDS, and when all conditions are satisfied, the set of S-boxes and lower-level MDS at that time are output in step S27.

(1) When one S-box 112 alone is activated on the input side of the lower-level MDS 113, if all four S-boxes 112 are activated on the output side of the lower-level MDS 113 and at least one of them has a difference smaller than the upper limit, it is determined that this verification is successful. This verification is made for each of the four S-boxes 112 on the input side (there are four different patterns).

(2) When only two S-boxes 112 are activated on the input side of the lower-level MDS 113, if all four S-boxes 112 are activated on the output side of the lower-level MDS 113, it is determined that this verification is successful, and if three S-boxes 112 are activated on the output side of the lower-level MDS 113, and at least one of them has a difference smaller than the upper limit, it is determined that this verification is successful. This verification is made for each of combinations of two S-boxes on the input side (there are six different patterns).

(3) When only two S-boxes 112 are activated on the output side of the lower-level MDS 113, if all four S-boxes 112 are activated on the input side of the lower-level MDS 113, it is determined that this verification is successful, and if three S-boxes 112 are activated on the input side of the lower-level MDS 113, and at least one of them has a difference smaller than the upper limit, it is determined that this verification is successful. This verification is made for each of combinations of two S-boxes on the output side (there are six different patterns).

(4) When one S-box 112 alone is activated on the output side of the lower-level MDS 113, if all four S-boxes 112 are activated on the input side of the lower-level MDS 113 and at least one of them has a difference smaller than the upper limit, it is determined that this verification is successful. This verification is made for each of the four S-boxes 112 on the output side (there are four different patterns).

The plurality of verification processes may be sequentially performed, or all or some of them may be parallelly performed. If one of the plurality of verification processes is not successful, all the subsequent verification processes may be canceled for that combination of S-box and lower-level MDS, and it may be determined that verification is not successful.

In the example of the sequence shown in FIG. 23, when the first combination of S-box and lower-level MDS which satisfies the conditions is obtained, the process is aborted. Alternatively, a plurality of combinations of S-boxes and lower-level MDS which satisfy the conditions may be obtained, and the best evaluated one of these combinations may be selected.

The encryption apparatus has been explained. An decryption apparatus will be explained below.

The decryption apparatus has a structure obtained by reversing that of the encryption apparatus (the same key is used).

FIG. 24 shows an example of the arrangement of a decryption apparatus corresponding to the encryption apparatus shown in FIG. 4.

FIG. 25 shows an example of the internal arrangement of the inverse transform of an extended S-box corresponding to FIG. 6.

Figure 26:
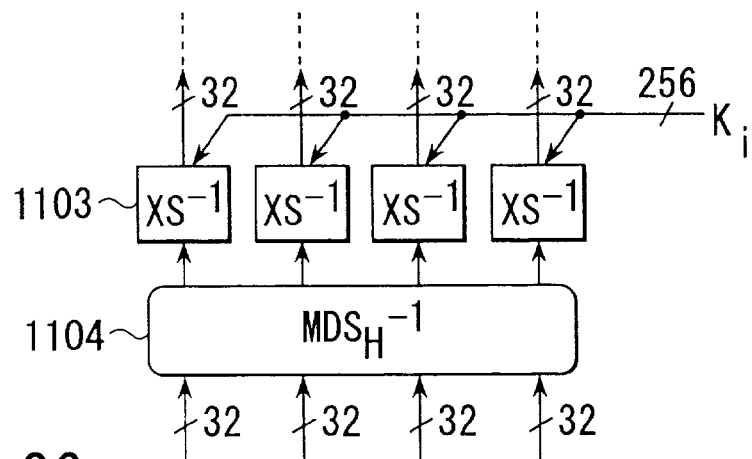
FIG. 26 shows an example of the structure of one stage of the inverse transform of a data randomizing part.

FIG. 26 shows an example of the structure of one stage of the inverse transform of a data randomizing part corresponding to FIG. 8.

In FIG. 24, a key scheduling part of the decryption apparatus has the same arrangement as that of the encryption apparatus shown in FIG. 4.

The input/output table of each S-box 1112, a lower-level MDS matrix of each lower-level MDS 1113, and a higher-level MDS matrix of a higher-level MDS 1104 have inverse functions (inverse matrices) of the input/output table of each S-box 112 (e.g., FIG. 5), the lower-level MDS matrix of each lower-level MDS 113 (e.g., FIG. 7), and the higher-level MDS matrix of the higher-level MDS 104 (e.g., FIGS. 9 and 10) in the encryption apparatus.

In FIG. 24, the key is generated in the same order as in FIG. 4, but may be generated in an order opposite to FIG. 4.

Figure 27:
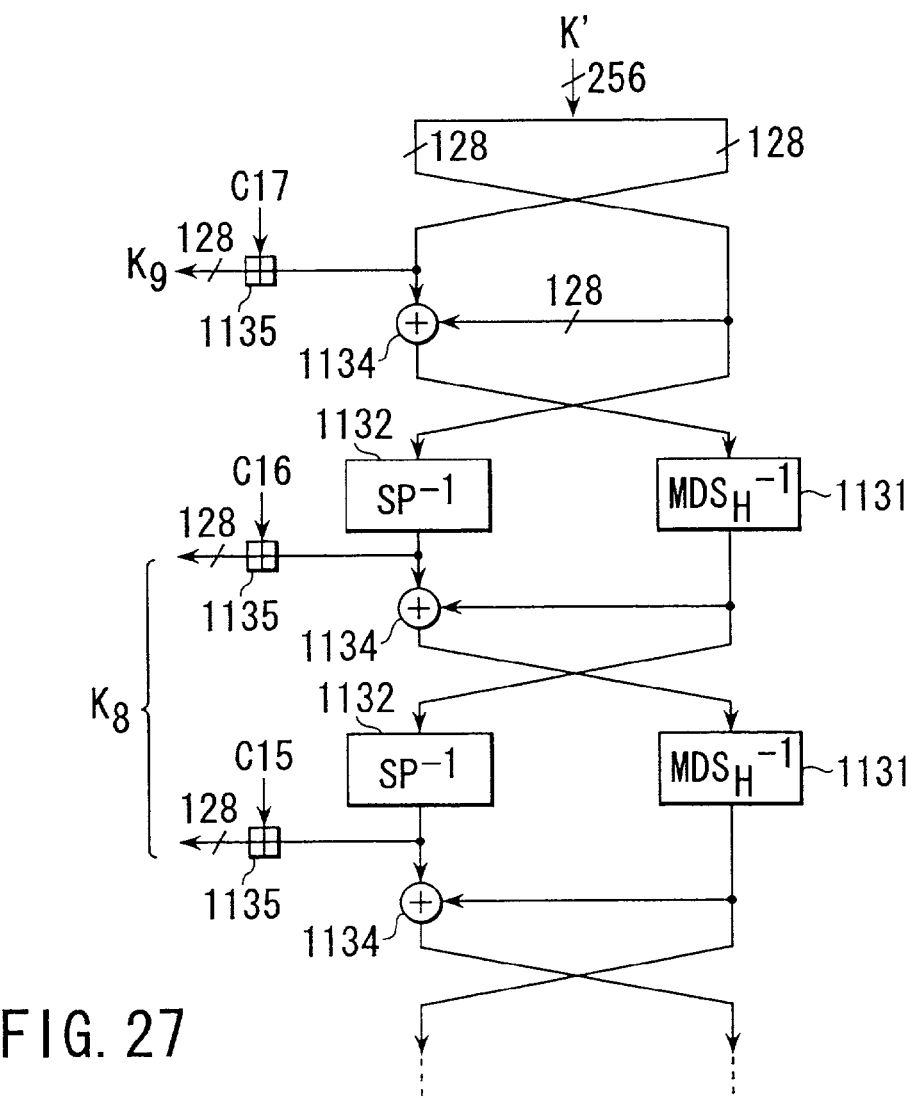
FIG. 27 is a block diagram showing an example of the arrangement of a key scheduling part.

FIG. 27 shows an example of the arrangement of the key scheduling part in such case.

Reference numeral 1132 denotes inverse transform of the nonlinear transformation layer 132 of FIG. 11 (including four parallel inverse transforms of the SP layers 133 (e.g., the inputs and outputs in FIG. 13 or 14 are reversed)).

The input/output table of each S-box, lower-level MDS matrix, higher-level MDS matrix used in the key scheduling part shown in FIG. 27 have inverse functions (inverse matrices) of those used in the key scheduling part in FIG. 11.

Assume that a decryption key input K' in FIG. 27 is the key used in the last key addition in FIG. 4 (for the encryption apparatus).

In this case as well, various variations of the locations where the stage number dependent constants $C_i$ are added as remainders are available in addition to the same method as in FIG. 12.

Hereinafter, a description is given of a preferred form of the higher-level MDS.

One reason why the security of the nested (recursive) SPN encryption against SQUARE attack is higher than SQUARE encryption/Rijndael encryption is randomizing by the higher-level MDS diffusion layer provided between S-boxes (between the second-half extended S-box and the first-half S-boxes of the succeeding (or the first) extended S-box). Here, the configuration of the higher-level MDS for making the resilience against SQUARE attack more effective will be described.

Usually, the SQUARE attack on SPN encryption follows a procedure of inputting 256 patterns (Λset) that satisfy conditions such that (i) variable bytes take 256 patterns and (ii) other bytes are fixed and searching for a key for which the bit sum for 256 patterns becomes zero, thereby estimating the key.

For this reason, the security against SQUARE attack can be improved by adding given conditions to the combination in the higher-level MDS (the combination relationship among input and output bits of the higher-level MDS or the interconnect relationship among operational paths). Roughly speaking, the given conditions are to double or multiple all or part of differential paths (operational paths between the first-half S-boxes of the preceding extended S-box and the first-half S-boxes of the succeeding extended S-box) (i.e., to make fan-in two or more). Thus, a high avalanche effect can be achieved and the number of stages that are subject to SQUARE attack can be reduced by one in comparison with the conventional technique.

An arrangement of the higher-level MDS will be described with reference to FIGS. 28 through 35. In each figure, it is supposed that data flows from the top side to the bottom side. In this example, the higher-level MDS is arranged such that the fan-in is set to two or more for all of the differential paths.

The higher-level MDS to be described here can be implemented in either hardware (e.g., an actual circuit formed on a semiconductor substrate) or software for carrying out functionally equivalent matrix operations or transformation based on input-to-output mapping table. A hardware implementation of the higher-level MDS will be described here with reference to FIGS. 28 to 35.

Figure 28:
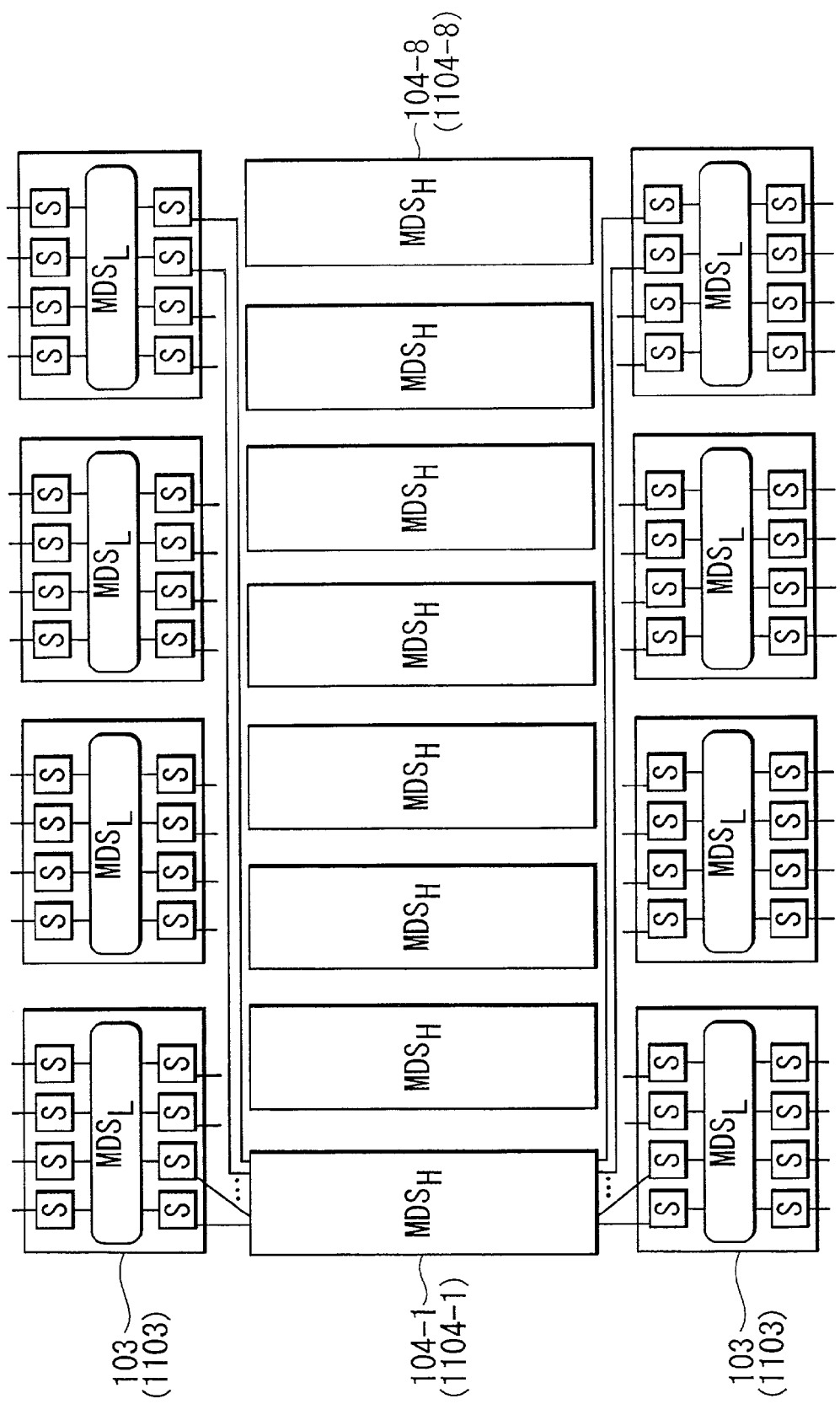
FIG. 28 shows still another example of the higher-level MDS.
Figure 29:
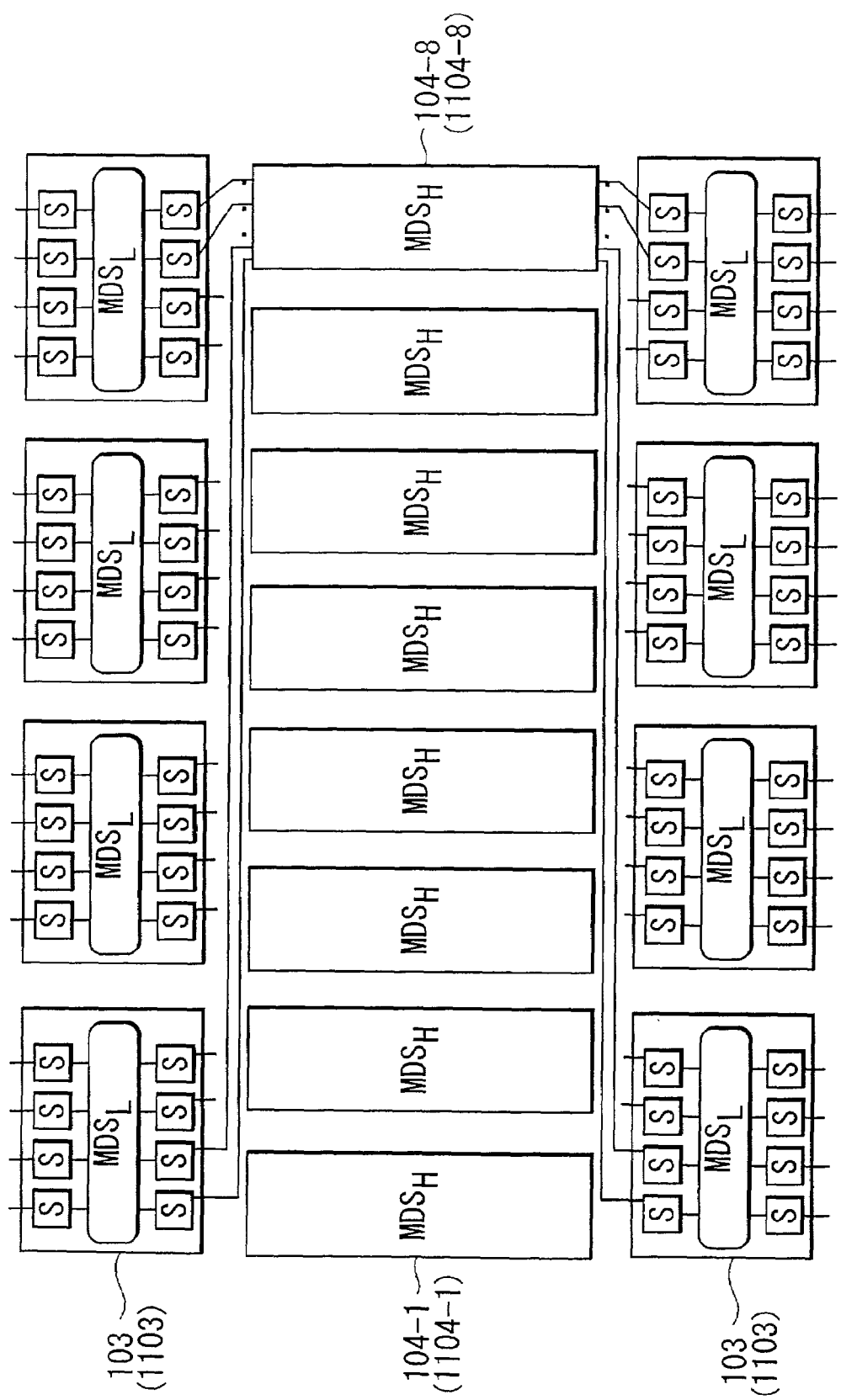
FIG. 29 shows a further example of the higher-level MDS.

In FIGS. 28 and 29, there are illustrated a higher-level MDS layer (portions 104-1 to 104-8 for encryption side and 1104-1 to 1104-8 for decryption side) in the encryption system of FIG. 4 and the decryption system of FIG. 24, and preceding and succeeding four parallel extended S-boxes (103 for encryption side and 1103 for decryption side). Each individual extended S-box comprises four parallel S-boxes, a lower-level MDS and four parallel S-boxes. The key addition shown in FIG. 6 is omitted in FIG. 28 and later of the drawings for the sake of simplicity.

FIGS. 28 and 29 illustrate the arrangement in which each of corresponding bits from the 8-bit S-boxes is subjected independently to the same processing as in FIG. 10. More specifically, FIG. 28 illustrates the MDS portion 104-1 which performs the processing on the leftmost bit of eight bits from each S-box (16-bit data or four sets of 4 bits of data). FIG. 29 illustrates the MDS portion 104-8 which performs the processing on the rightmost bit of eight bits from each S-box. Though not shown, each of the other six bits from each S-box is processed by a corresponding MDS portion.

The interconnections and layout illustrated in FIG. 28 and later of the drawings show a logical relationship. The actual interconnections and layout have a degree of freedom in design. Although, in the example of FIG. 28, eight higher-level MDS portions 104-1 to 104-8 are installed, only one, two or four of them may be installed so that they are time-shared.

The encryption and the decryption are implemented in substantially the same manner (the process for decryption is the reverse of the process for encryption). Thus, a description is given hereinafter of encryption. Assuming that the higher-level MDS layer portions 104-1 to 104-8 have the same arrangement, one portion 104-1 will be described.

Figure 30:
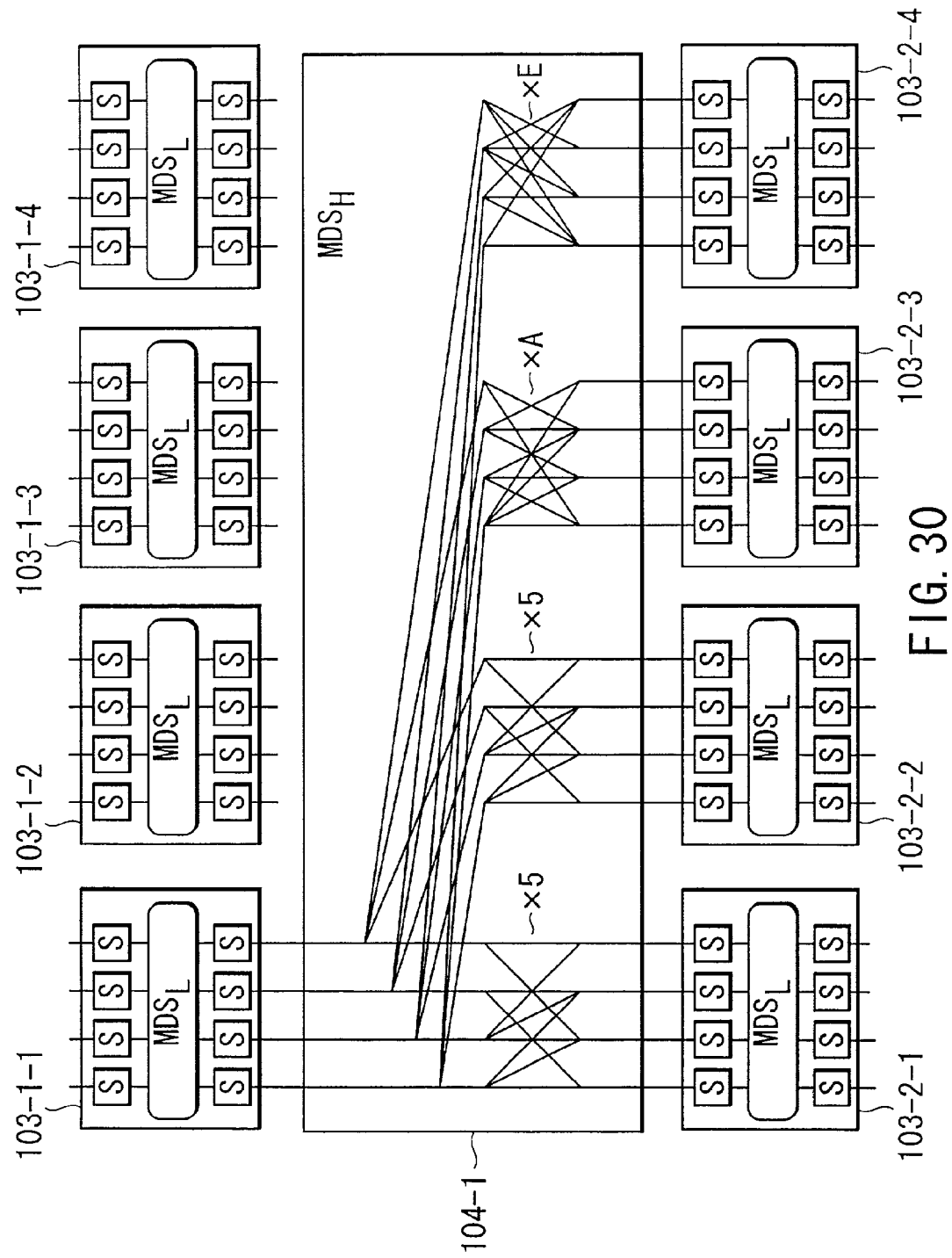
FIG. 30 shows a part of an example of S-box-to-S-box connection patterns in the higher-level MDS.

FIG. 30 shows a coupling relationship between four second-half S-boxes in the first extended S-box 103-1-1 preceding the MDS portion 104-1 (hereinafter referred simply to as the higher-level MDS) in the higher-level MDS layer and a total of 16 first-half S-boxes in the four extended S-boxes 103-2-1 to 103-2-4 succeeding the higher-level MDS 104-1. In FIGS. 30 to 35, at points where bit lines join multiple bits are exclusive ORed. In each figure, illustration of exclusive OR circuits is omitted.

Figure 31:
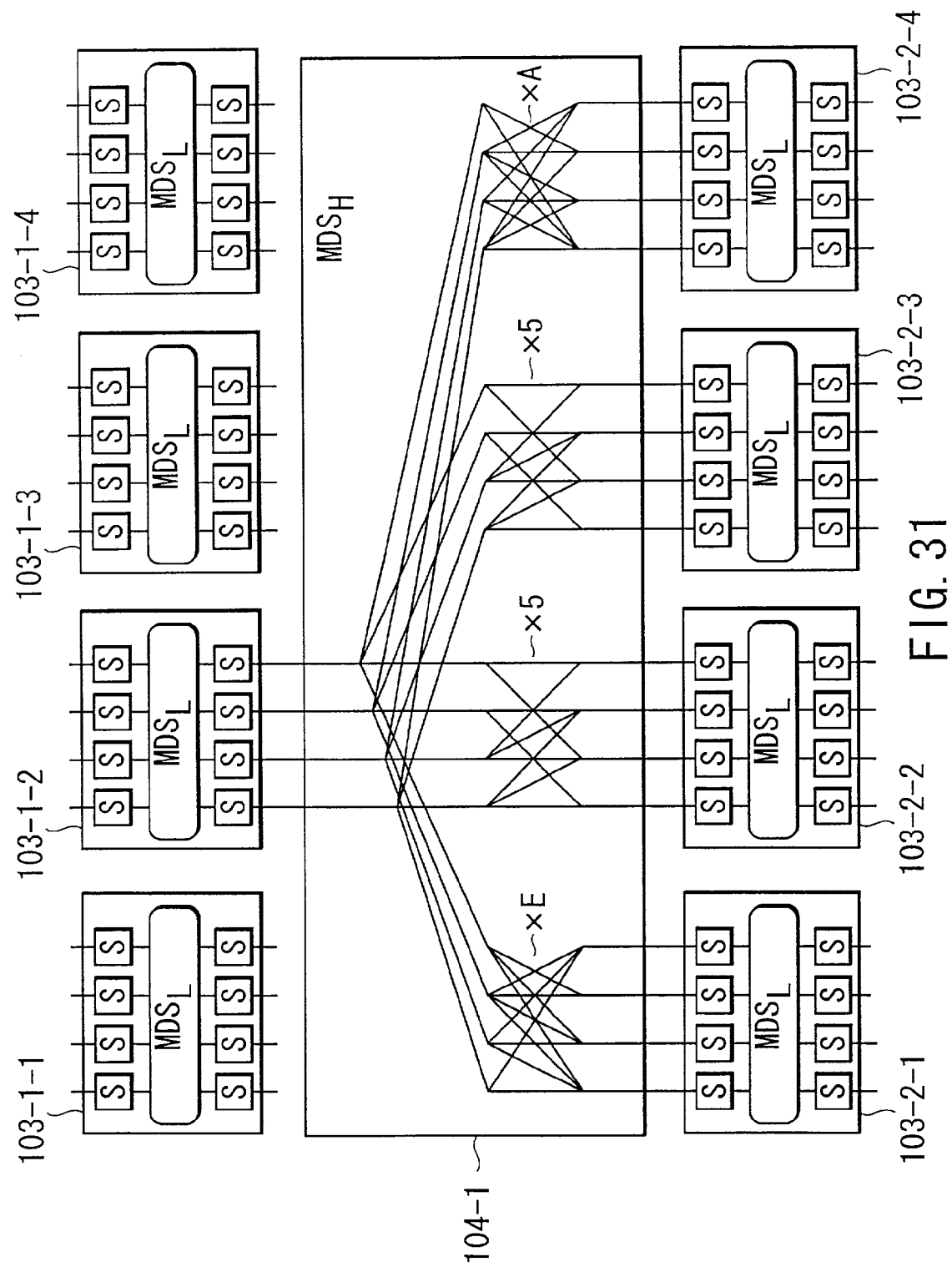
FIG. 31 shows another part of the example of S-box-to-S-box connection patterns in the higher-level MDS.

FIG. 31 shows a similar relationship to the coupling relationship in FIG. 30 for the second extended S-box 103-1-2 preceding the higher-level MDS 104-1.

Figure 32:
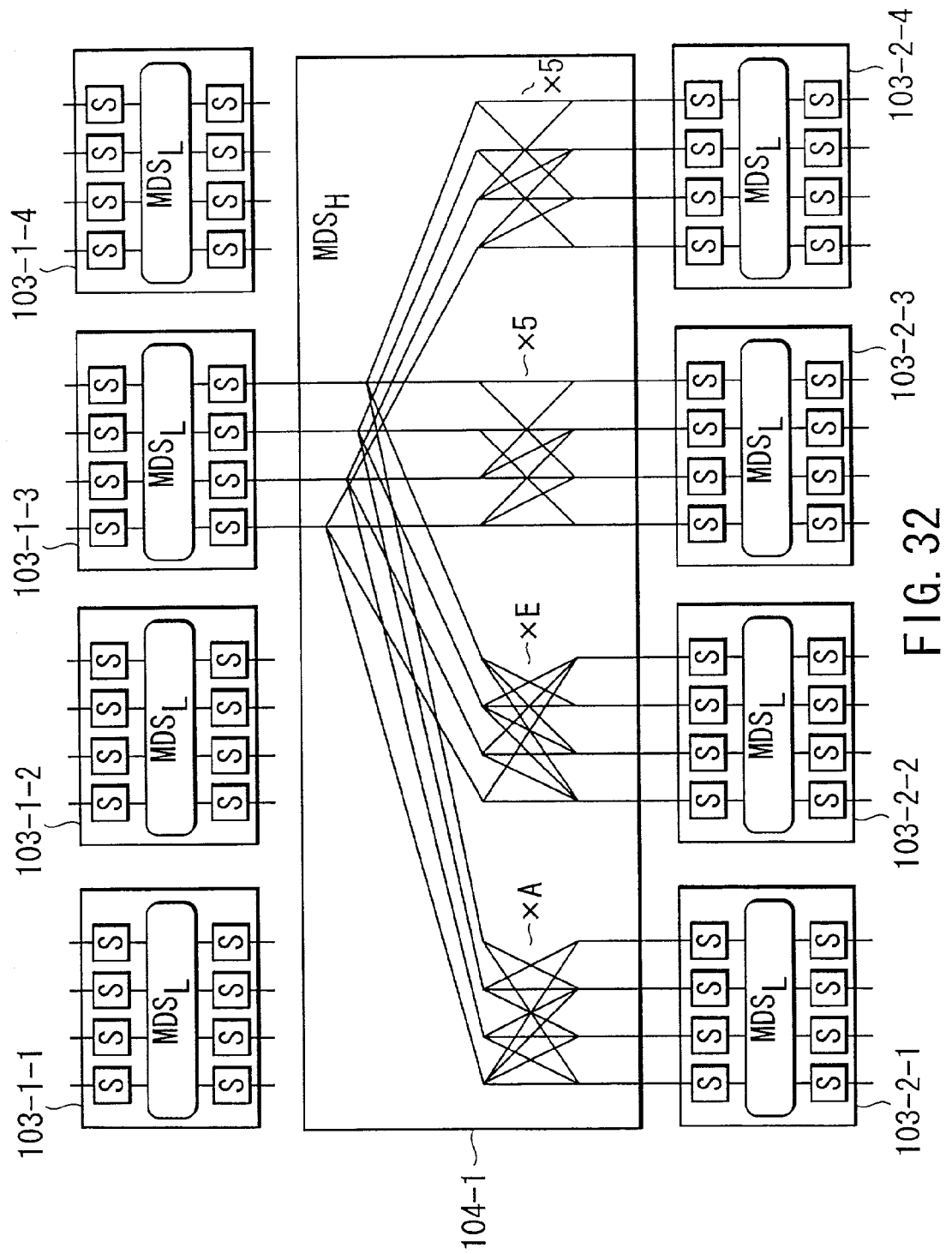
FIG. 32 shows a still another part of the example of S-box-to-S-box connection patterns in the higher-level MDS.

FIG. 32 shows a similar relationship to the coupling relationship in FIG. 30 for the third extended S-box 103-1-3 preceding the higher-level MDS 104-1.

Figure 33:
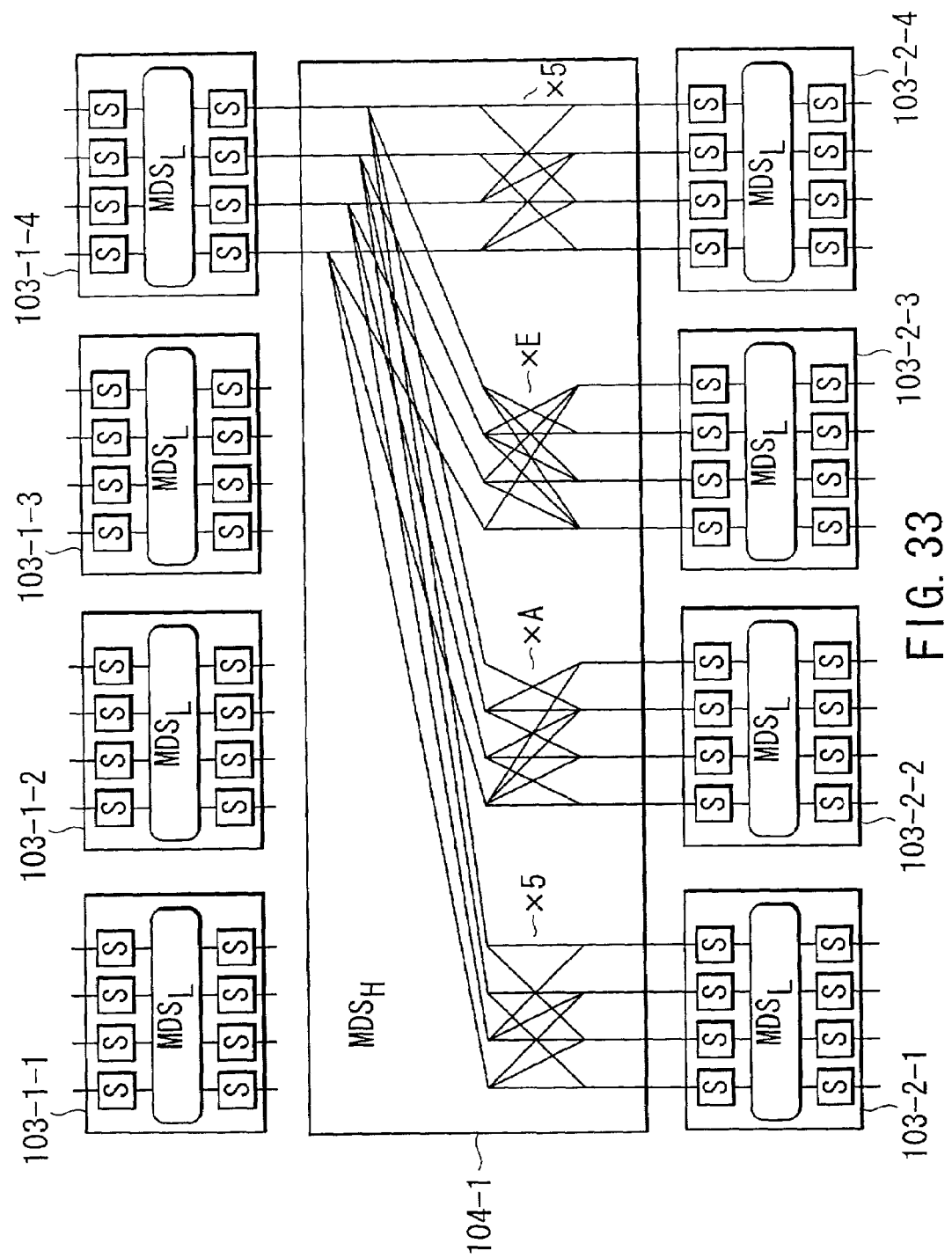
FIG. 33 shows a further part of the example of S-box-to-S-box connection patterns in the higher-level MDS.

FIG. 33 shows a similar relationship to the coupling relationship in FIG. 30 for the fourth extended S-box 103-1-4 preceding the higher-level MDS 104-1.

Figure 34:
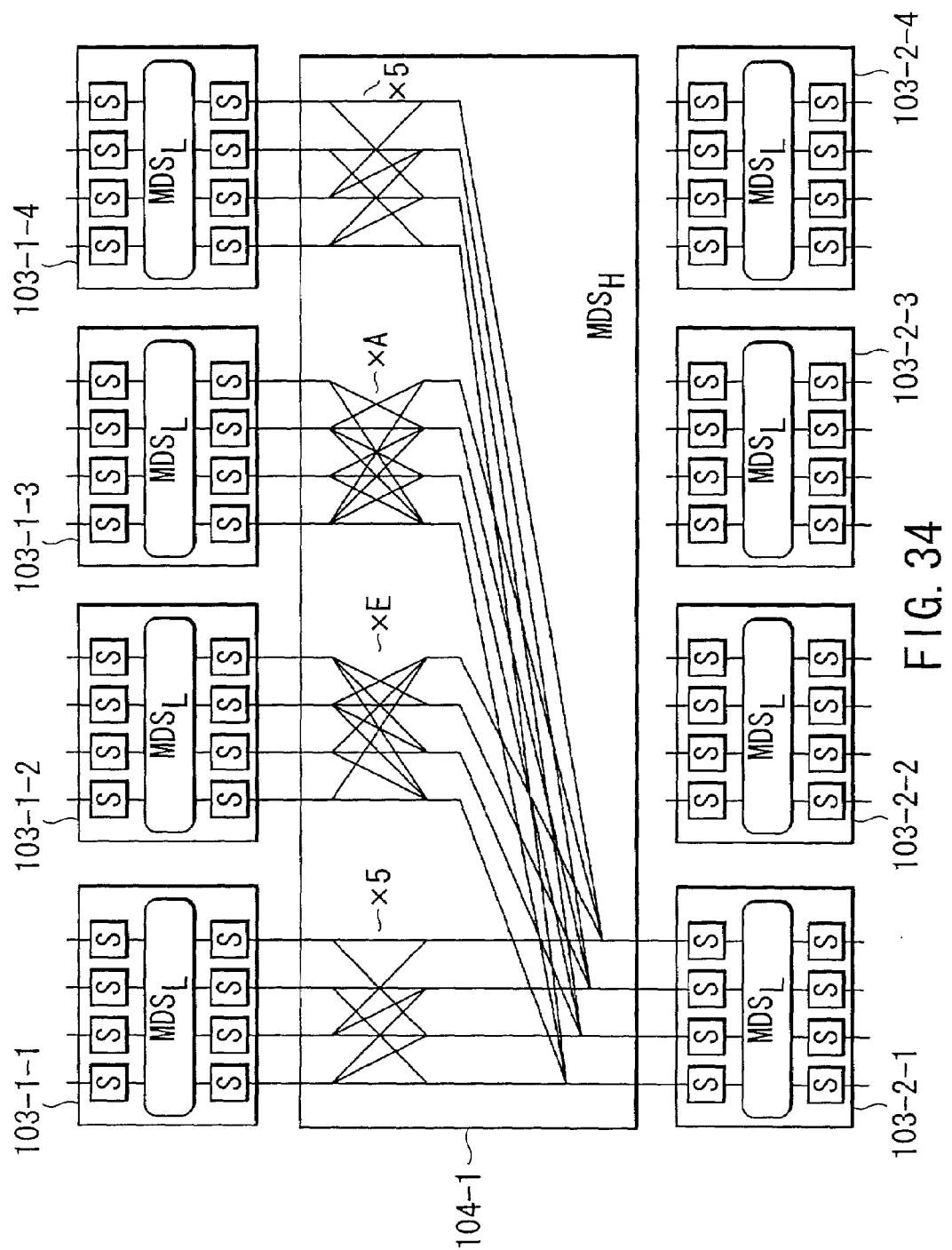
FIG. 34 shows a still further part of the example of S-box-to-S-box connection patterns in the higher-level MDS.

Referring to FIGS. 30 to 33, each S-box in the four extended S-boxes succeeding the higher-level MDS is coupled by exclusive logical sum to S-boxes in the four extended S-boxes preceding the higher-level MDS. Similarly, each S-box in the four extended S-boxes preceding the higher-level MDS is coupled by exclusive logical sum to S-boxes in the four extended S-boxes succeeding the higher-level MDS. This is illustrated in FIG. 34 for the first extended S-box 103-2-1 succeeding the higher-level MDS. Although the illustrations for the other extended S-boxes 103-2-2 to 103-2-4 succeeding the higher-level MDS are omitted, similar coupling relationships to that in FIG. 34 hold. Although, in this example, the coupling by exclusive logical sum as shown in FIGS. 30 to 34 is followed by coupling by exclusive logical sum as shown in FIG. 34, the coupling by exclusive logical sum may be made at a time or in two or more stages.

The above exemplary arrangement of the higher-level MDS is based on the following criterion.

Consider two consecutive stages (i.e., FIGS. 30 to 34) in the encryption circuit as shown in FIG. 4. The first-half S-boxes in the preceding extended S-box 103 and the first-half S-boxes in the succeeding extended S-box 103 are connected together through the second-half S-boxes in the preceding extended S-box 103. At this point, the higher-level MDS (130-1 to 130-8) is arranged based on the following criteria:

(1) Any selected one of the S-boxes (a total of 16 S-boxes in this example) in the first-half of the preceding extended S-box 103 and any selected one of the S-boxes (a total of 16 S-boxes in this example) in the first-half of the succeeding extended S-box 103 are interconnected (coupled) by two or more paths.

(2) The inverse transform or inverse function of linear diffusion performed by the higher-level MDS (i.e., the higher-level MDS on the decryption circuit side) exists and it also satisfies the same condition as in (1).

Figure 35:
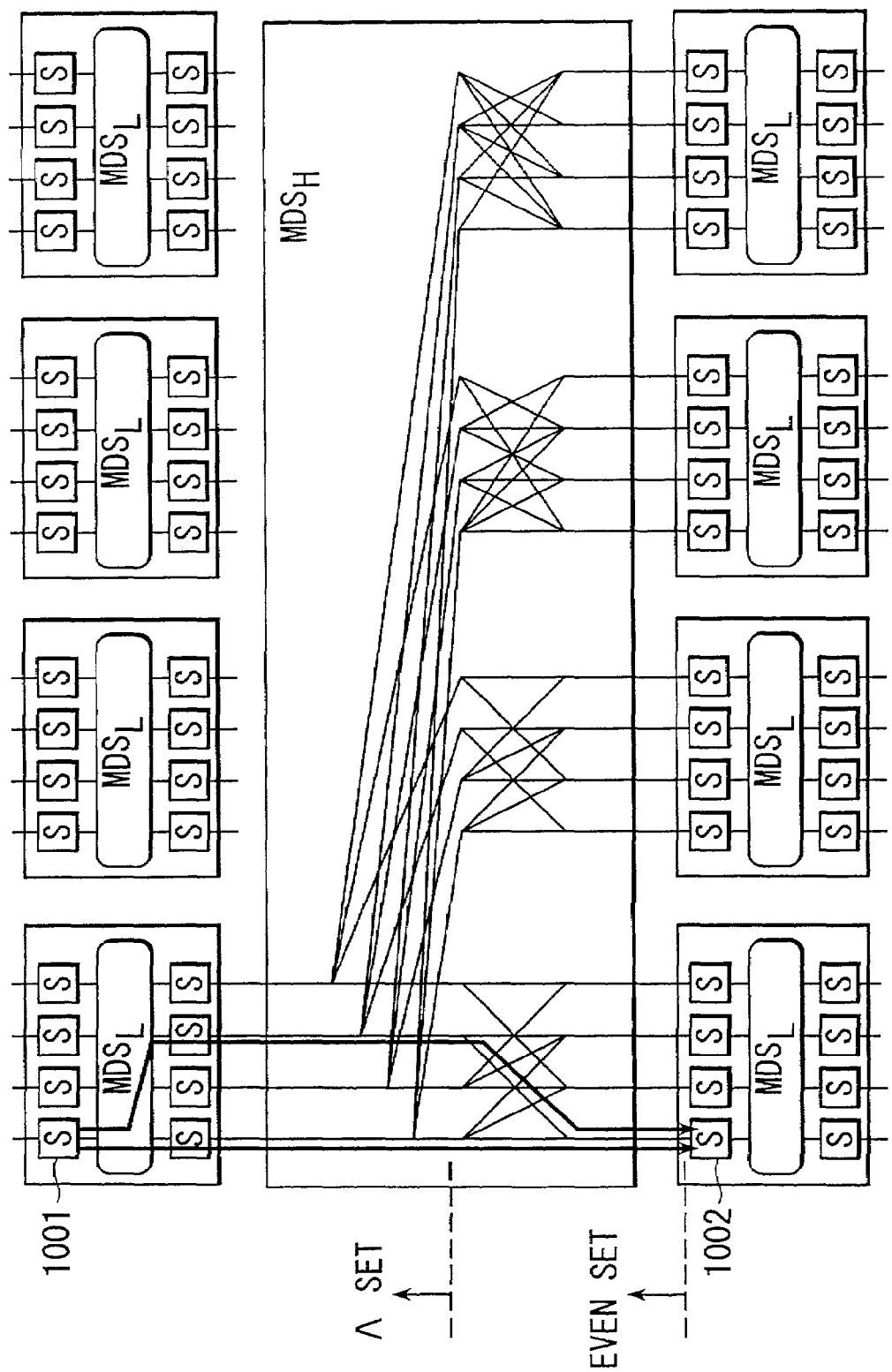
FIG. 35 is a diagram for use in explanation of paths between S-boxes in preceding and succeeding stages of the higher-level MDS.
Figure 36:
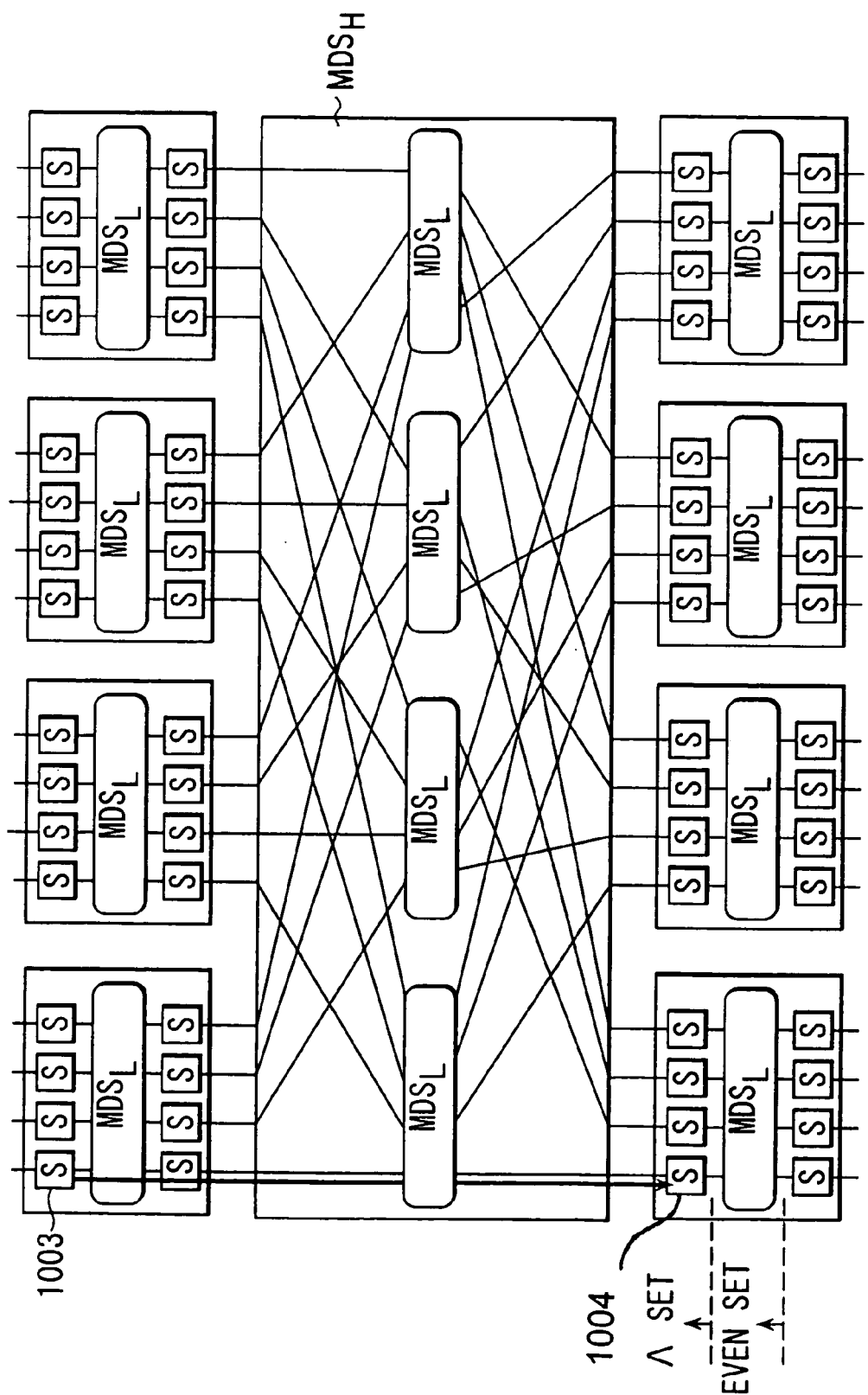
FIG. 36 is a diagram for use in explanation of paths between S-boxes in preceding and succeeding stages of the conventional higher-level MDS.

As for (1), for example, an S-box 1001 in the first-half of the preceding extended S-box and an S-box 1002 in the first-half of the succeeding extended S-box 103 are interconnected by two paths indicated by bold lines as shown in FIG. 35. Other S-boxes are also interconnected by two to four paths. In contrast, with the conventional SQUARE encryption/Rijndael encryption, an S-box 1003 in the first-half of the preceding extended S-box and an S-box 1004 in the first-half of the succeeding extended S-box 103 are interconnected by only one path (fan–in=1) as shown in FIG. 36 and the same is true of other S-boxes. Therefore, the avalanche effect is low.

Concerning (2), the condition is satisfied as will be described later.

The security against SQUARE attack in the arrangement that meet the above criteria will be described below.

A Λ (lambda) set used as an input in SQUARE attack is defined as follows:

Consider a set of 256 pieces of data each of which comprises concatenation of n bytes where "n" is an integer greater than one and 1 byte comprises 8 bits. Such a set of 256 pieces of data each of n bytes is referred to as the Λ set when either of the following conditions is satisfied for each byte in all the data:

(a) All 256 ($=2^8$) values each byte can take appear.

(b) Only one of 256 values each byte can take appears (i.e., the byte value is fixed all the time).

The Λ set has the following properties:

A set of outputs of parallel S-boxes (reversible) to which the Λ set is input is also the Λ set.

When a Λ set which comprises only one byte in which its value is not fixed is input to the second-half S-boxes in the preceding extended S-box 103 in the arrangement that meets the above criteria as shown in FIGS. 30 to 34, the following properties hold with a probability of unity (see FIG. 35):

(i) It is through the outputs of the second-half S-boxes in the preceding extended S-box that the Λ set appears.

(ii) It is through the inputs of the first-half S-boxes in the succeeding extended S-box that the sum of arbitrary bits for 256 patterns becomes zero (even set).

In contrast, with the conventional SQUARE encryption/Rijndael encryption, the following properties hold with a probability of unity (see FIG. 36):

(i') The Λ set appears past the first-half S-boxes in the succeeding extended S-box.

(ii') The sum of arbitrary bits in the input positions of the second-half S-boxes in the succeeding extended S-box for 256 patterns becomes zero.

Thus, with the higher-level MDS that meets the above criteria, the property (the Λ set) which is effective in cryptanalysis is destroyed one S-box layer earlier than with the conventional SQUARE encryption/Rijndael encryption. That is, even with the arrangement which is one layer less than SQUARE encryption/Rijndael encryption with a given number of stages, the strength against SQUARE attack is expected to remain unchanged. Thus, it will be appreciated that the security against SQUARE attack is improved by the amount corresponding to one S-box layer.

Various variations are possible with the coupling relationship described in connection with FIGS. 30 to 34, which will be described below.

Figure 37:
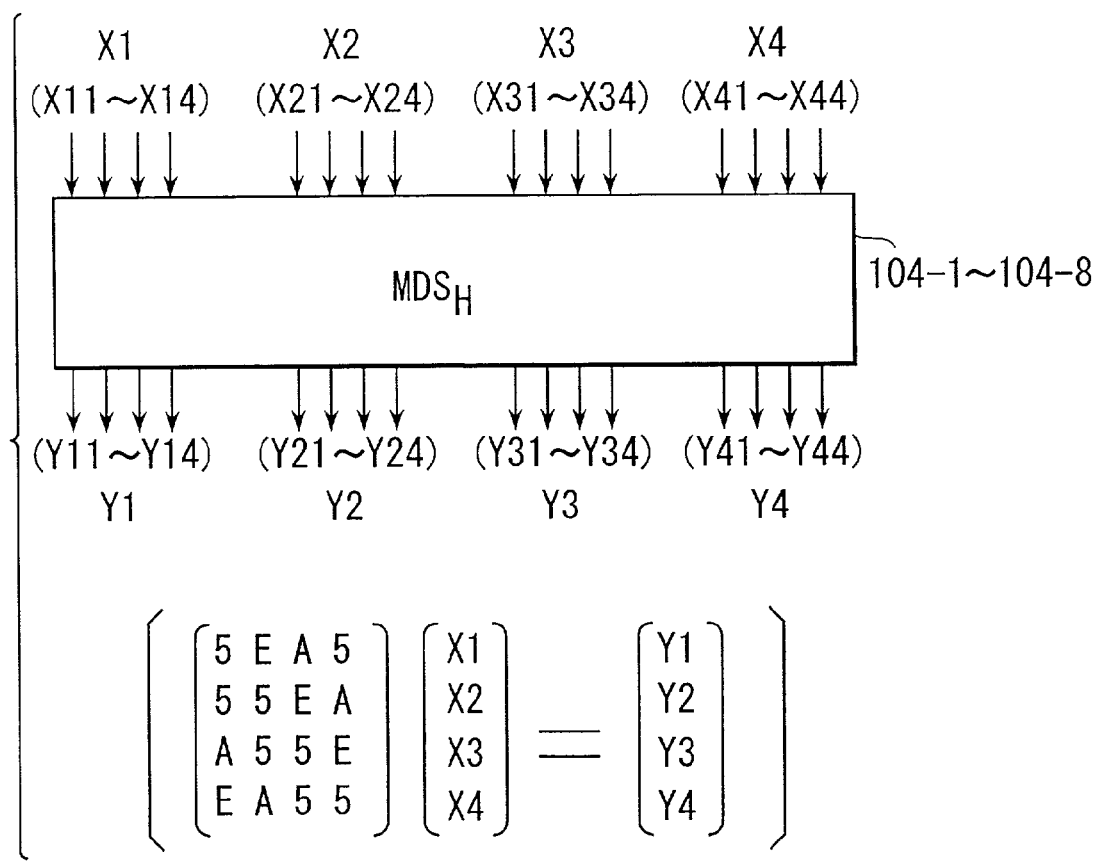
FIG. 37 is a diagram for use in explanation of matrix representation of $GF(2^4)$ in the higher-level MDS.

In the exemplary arrangement of the higher-level MDS shown in FIGS. 30 to 34, let four bits, each taken from a respective one of the four second-half S-boxes in the preceding extended S-box 103-1-1, be represented by $X_{11}$-$X_{14}$ and then collectively referred to as 4-bit data $X_1$, as shown in FIG. 37. Likewise, let four bits from each of the extended S-boxes 103-1-2, 103-1-3 and 103-1-4 be represented by $X_{21}$-$X_{24}$ and $X_2$, $X_{31}$-$X_{34}$ and $X_3$, and $X_{41}$-$X_{44}$ and $X_4$. Let four bits from each of the succeeding extended S-boxes 103-2-1, 103-2-2, 103-2-3 and 103-2-4 be expressed by $Y_{11}$-$Y_{14}$ and $Y_1$, $Y_{21}$-$Y_{24}$ and $Y_2$, $Y_{31}$-$Y_{34}$ and $Y_3$, and $Y_{41}$-$Y_{44}$ and $Y_4$.

In this case, considering the 4-bit data $X_1$-$X_4$ and $Y_1$-$Y_4$ as elements of $GF(2^4)$, the higher-level MDS matrix for determining output data $Y_1$-$Y_4$ from input data $X_1$-$X_4$ is as depicted in FIG. 37.

In FIGS. 30 to 34, the connection (connection pattern) between four bits each taken from a respective one of four second-half parallel S-boxes in one preceding extended S-box and four bits each taken from a respective one of four first-half parallel S-boxes in one succeeding extended S-box is represented by multiplications over $GF(2^4)$ for the corresponding matrix elements shown in FIG. 37 (indicated by x5, xA, xE in FIGS. 30 to 34). That is, the linear diffusion in FIGS. 30 to 34 and the linear diffusion in FIG. 37 are equivalent to each other.

Figure 38:
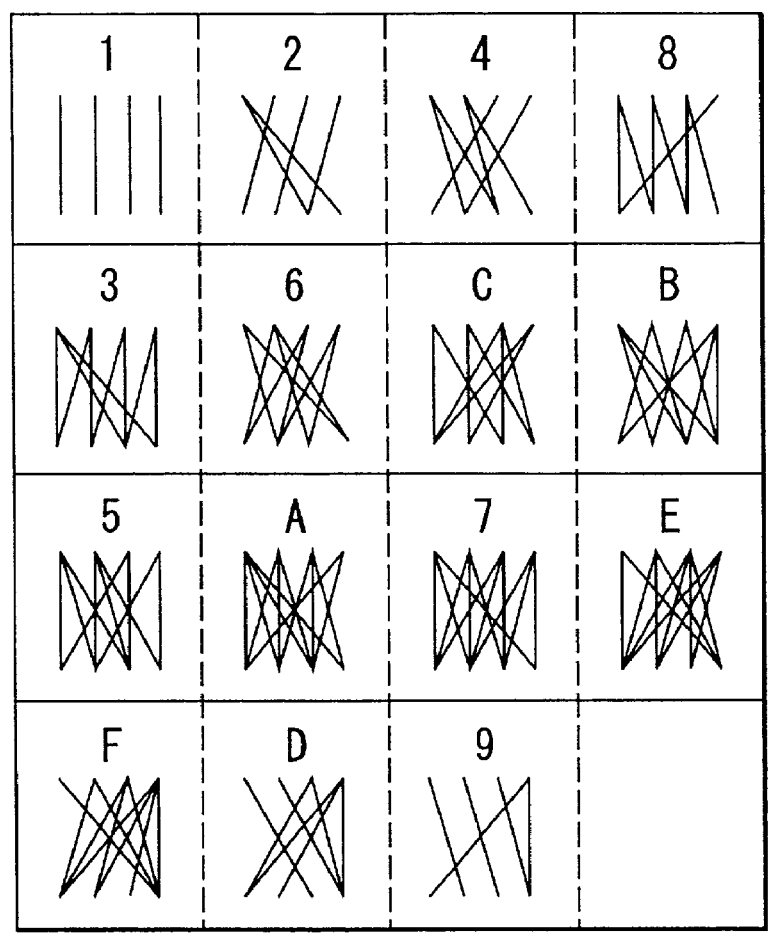
FIG. 38 shows connection representations of the MDS by a multiplication over $GF(2^4)$.

FIG. 38 shows connection patterns for multiplications over $GF(2^4)$ for each of elements "1" to "F" of $GF(2^4)$. As described previously, exclusive logical sum is performed in coupling portions.

In creating the higher-level MDS arranged to meet the above criteria, 16 connection portions in FIGS. 30 to 34 can be selected from connection patterns corresponding to "3", "6", "C", "B", "5", "A", "7", and "E". However, it is required that the arrangement corresponding to the inverse transform meet the same conditions.

In this case, a higher-level MDS (its candidate) on the decryption side when a higher-level MDS (its candidate) on the encryption side has been determined or a higher-level MDS (its candidate) on the encryption side when a higher-level MDS (its candidate) on the decryption side has been determined can be obtained readily by determining the inverse matrix of such a matrix as shown in FIG. 37.

That is, if each of elements in the $GF(2^4)$ matrix and its inverse matrix is any one of "3", "5", "C", "B", "5", "A", "7", and "E", then the above criteria will be met.

Examples of MDS matrix representations $M_1$-$M_8$ that meet the above criteria are illustrated as follows.

$$\begin{pmatrix} 5 & E & A & 5 \\ 5 & 5 & E & A \\ A & 5 & 5 & E \\ E & A & 5 & 5 \end{pmatrix} = M_1 \quad \begin{pmatrix} B & 6 & E & E \\ E & B & 6 & E \\ E & E & B & 6 \\ 6 & E & E & B \end{pmatrix} = M_2 = M_1^{-1}$$

$$\begin{pmatrix} 6 & E & E & B \\ B & 6 & E & E \\ E & B & 6 & E \\ E & E & B & 6 \end{pmatrix} = M_3 \quad \begin{pmatrix} 5 & 5 & E & A \\ A & 5 & 5 & E \\ E & A & 5 & 5 \\ 5 & E & A & 5 \end{pmatrix} = M_4 = M_3^{-1}$$

$$\begin{pmatrix} 3 & C & 7 & 3 \\ 3 & 3 & C & 7 \\ 7 & 3 & 3 & C \\ C & 7 & 3 & 3 \end{pmatrix} = M_5 \quad \begin{pmatrix} B & 3 & 3 & E \\ E & B & 3 & 3 \\ 3 & E & B & 3 \\ 3 & 3 & E & B \end{pmatrix} = M_6 = M_5^{-1}$$

$$\begin{pmatrix} 3 & E & B & 3 \\ 3 & 3 & E & B \\ B & 3 & 3 & E \\ E & B & 3 & 3 \end{pmatrix} = M_7 \quad \begin{pmatrix} 7 & 3 & 3 & C \\ C & 7 & 3 & 3 \\ 3 & C & 7 & 3 \\ 3 & 3 & C & 7 \end{pmatrix} = M_8 = M_7^{-1}$$

These matrices have been searched for under the following constraints:

(1) The matrices are of a cyclic type.

(2) Only one is selected from matches resulting from rearrangement of elements.

Here, the rearrangement is an operation performed by combining a cyclic operation such that $(1, 2, 3, 4) \rightarrow (2, 3, 4, 1)$ and an inverse operation such that $(1, 2, 3, 4) \rightarrow (4, 3, 2, 1)$ any number of times. For example, an operation of $(3, 3, 7, C) \rightarrow (3, 7, C, 3) \rightarrow (3, C, 7, 3)$ comes under the rearrangement, but an operation of $(3, 3, 7, C) \rightarrow (3, 7, 3, C)$ does not.

As can be seen from comparison between matrices which are inverses of one another, each of the matrices corresponds to the one obtained by performing rearrangement on the inverse matrix of the other matrix. For example, (6, B, E, E) is a rearrangement of $(5, 5, A, E)^{-1}$=(B, E, E, 6).

The linear diffusion can be implemented by such an actual circuit as shown in FIGS. 30 to 34 using connection representations for multiplications or by matrix operations or input-to-output transformation tables.

Each of matrices $M_1$ and $M_2$ is the inverse of the other, one being used on the encryption side and the other being used on the decryption side. The same is true of matrices $M_3$ and $M_4$; $M_5$ and $M_6$; and $M_7$ and $M_8$. The implementation method may vary between the encryption side and the decryption side.

Figure 39A:
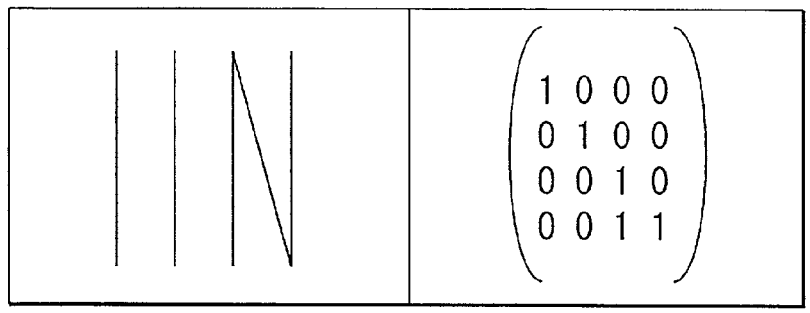
FIGS. 39A, 39B, 39C, and 39D show examples of connection representations of the MDS other than by the multiplication over $GF(2^4)$.
Figure 39B:
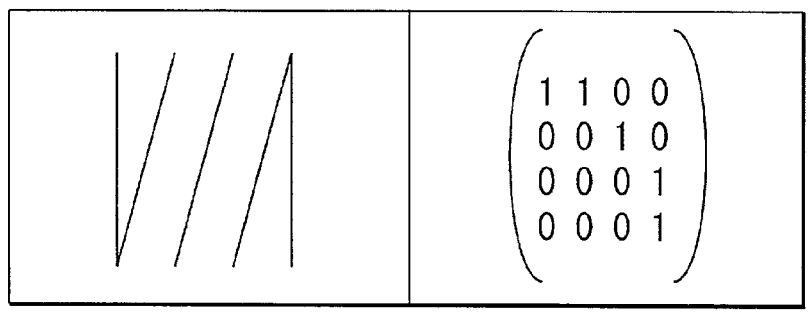
Figure 39C:
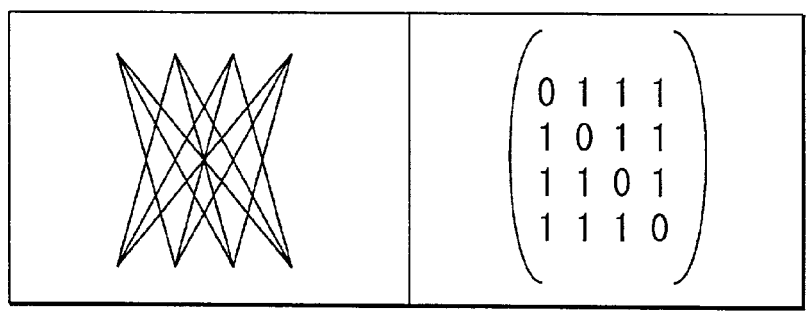
Figure 39D:
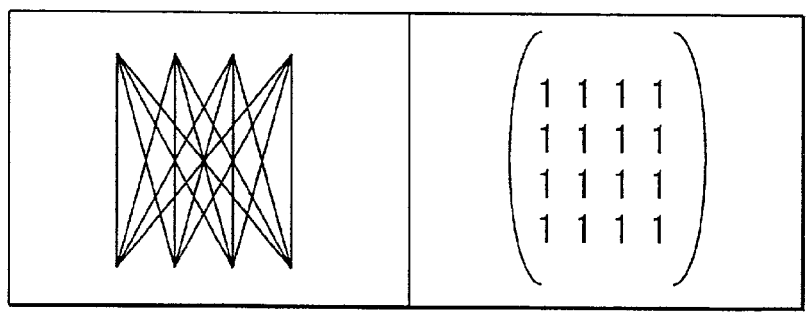

The connection pattern between preceding and succeeding S-boxes is not restricted to the patterns "3", "6", "C", "B", "5", "A", "7", and "E" shown in FIG. 38. For example, FIGS. 39A to 39D illustrate patterns other than the connection patterns for multiplication over $GF(2^4)$ and the connection patterns as shown in FIGS. 39C and 39D may be used. As described previously, the exclusive ORing is implemented in the coupling portions in the connection patterns.

In this case, a 16 (rows)×16 (columns) MDS matrix is used with $X_{11}$-$X_{14}$, $X_{21}$-$X_{24}$, $X_{31}$-$X_{34}$ and $X_{41}$-$X_{44}$ in FIG. 37 as 16 inputs and $Y_{11}$-$Y_{14}$, $Y_{21}$-$Y_{24}$, $Y_{31}$-$Y_{34}$ and $Y_{41}$-$Y_{44}$ as 16 outputs.

For example, the linear diffusion of FIG. 37 can be represented as follows.

$$\begin{pmatrix} 1 & 0 & 1 & 0 & 1 & 1 & 1 & 1 & 1 & 1 & 0 & 1 & 1 & 0 & 1 & 0 \\ 1 & 1 & 0 & 1 & 0 & 1 & 1 & 1 & 1 & 1 & 1 & 0 & 1 & 1 & 0 & 1 \\ 1 & 1 & 1 & 0 & 0 & 0 & 1 & 1 & 1 & 1 & 1 & 1 & 1 & 1 & 1 & 0 \\ 0 & 1 & 0 & 1 & 1 & 1 & 1 & 0 & 1 & 0 & 1 & 0 & 0 & 1 & 0 & 1 \\ 1 & 0 & 1 & 0 & 1 & 0 & 1 & 0 & 1 & 1 & 1 & 1 & 1 & 1 & 0 & 1 \\ 1 & 1 & 0 & 1 & 1 & 1 & 0 & 1 & 0 & 1 & 1 & 1 & 1 & 1 & 1 & 0 \\ 1 & 1 & 1 & 0 & 1 & 1 & 1 & 0 & 0 & 0 & 1 & 1 & 1 & 1 & 1 & 1 \\ 0 & 1 & 0 & 1 & 0 & 1 & 0 & 1 & 1 & 1 & 1 & 0 & 1 & 0 & 1 & 0 \\ 1 & 1 & 0 & 1 & 1 & 0 & 1 & 0 & 1 & 0 & 1 & 0 & 1 & 1 & 1 & 1 \\ 1 & 1 & 1 & 0 & 1 & 1 & 0 & 1 & 1 & 1 & 0 & 1 & 0 & 1 & 1 & 1 \\ 1 & 1 & 1 & 1 & 1 & 1 & 1 & 0 & 1 & 1 & 1 & 0 & 0 & 0 & 1 & 1 \\ 1 & 0 & 1 & 0 & 0 & 1 & 0 & 1 & 0 & 1 & 0 & 1 & 1 & 1 & 1 & 0 \\ 1 & 1 & 1 & 1 & 1 & 1 & 0 & 1 & 1 & 0 & 1 & 0 & 1 & 0 & 1 & 0 \\ 0 & 1 & 1 & 1 & 1 & 1 & 1 & 0 & 1 & 1 & 0 & 1 & 1 & 1 & 0 & 1 \\ 0 & 0 & 1 & 1 & 1 & 1 & 1 & 1 & 1 & 1 & 1 & 0 & 1 & 1 & 1 & 0 \\ 1 & 1 & 1 & 0 & 1 & 0 & 1 & 0 & 0 & 1 & 0 & 1 & 0 & 1 & 0 & 1 \end{pmatrix} \begin{pmatrix} X_{11} \\ X_{12} \\ X_{13} \\ X_{14} \\ X_{21} \\ X_{22} \\ X_{23} \\ X_{24} \\ X_{31} \\ X_{32} \\ X_{33} \\ X_{34} \\ X_{41} \\ X_{42} \\ X_{43} \\ X_{44} \end{pmatrix} = \begin{pmatrix} Y_{11} \\ Y_{12} \\ Y_{13} \\ Y_{14} \\ Y_{21} \\ Y_{22} \\ Y_{23} \\ Y_{24} \\ Y_{31} \\ Y_{32} \\ Y_{33} \\ Y_{34} \\ Y_{41} \\ Y_{42} \\ Y_{43} \\ Y_{44} \end{pmatrix}$$

That is, replacing each of elements "5", "A" and "E" in FIG. 37 with a corresponding 4×4 matrix results in the above representation. In this representation, the 16×16 matrix is shown divided into sixteen 4×4 submatrices.

For example, in using the connection pattern shown FIG. 39C or 39D as the connection pattern between given S-boxes, a corresponding 4×4 portion in the 16×16 matrix in the above representation is simply replaced with the 4×4 matrix representation shown in FIG. 39C or 39D. The same holds for other desired connection patterns. The 4×4 matrix representation of a connection pattern corresponds to a transformation matrix with the input of the connection pattern considered as four 1-bit inputs and the output as four 1-bit outputs.

Thus, when an arbitrary connection pattern is used as the connection pattern between S-boxes in FIGS. 30 to 34, the inverse matrix of a matrix for encryption becomes a matrix for decryption. The linear diffusion in this case can also be implemented by such an actual circuit as shown in FIGS. 30 to 34 using arbitrary connection patterns (in the same manner as in FIGS. 30-34) or by matrix operations or input-to-output transformation tables.

As described previously, the criterion (1) has been set such that any selected one of the first-half S-boxes in the preceding extended S-box and any selected one of the first-half S-boxes in the succeeding extended S-box are interconnected (coupled) by two or more paths in any combination of S-boxes.

It is also possible to ease this condition.

For example, the following condition is considered:

(1') In all combinations of preceding and succeeding extended S-boxes, at least one set of one of the four second-half S-boxes in the preceding extended S-box and one of the four first-half S-boxes in the succeeding extended S-box is interconnected (coupled) by two or more paths.

For example, the following condition is considered:

(1") At least one of the first-half S-boxes in the preceding extended S-box and at least one of the first-half S-boxes in the succeeding extended S-box are interconnected (coupled) by two or more paths.

Under these conditions, selections can be made from the connection representations (connection patterns) corresponding to "1" to "F" in FIG. 38 even in restricting the S-box-to-S-box connection patterns to multiplication connection representations (connection patterns) over $GF(2^4)$.

When the S-box-to-S-box connection patterns are not restricted to multiplication connection representations (connection patterns) over $GF(2^4)$, various connection patterns including the examples shown in FIGS. 39C and 39D or corresponding matrices can be used.

Although the embodiment has been described as using the same criterion for encryption and decryption, it is also possible to use different criteria for encryption and decryption. For example, it is possible to apply the criterion (1) to one of encryption and decryption and the criterion (1') to the other. Other methods are also possible.

Based on the same idea as described above, processing may be performed in units of 2 bits at corresponding positions of 8-bit data, and four 4×4 MDS matrices ($GF(2^8)$) having 8-bit elements may be prepared as higher-level MDS matrices. On the other hand, processing may be performed in units of 4 bits at corresponding positions of 8-bit data, and two 4×4 MDS matrices ($GF(2^{16})$) having 16-bit elements may be prepared to form higher-level MDS matrices. Furthermore, one 4×4 MDS matrix ($GF(2^{32})$) having 32-bit elements may be prepared to form higher-level MDS matrices.

In the above description, bits at corresponding positions are extracted and processed. Alternatively, bits at different positions may be (exclusively) extracted and processed.

Figure 40:
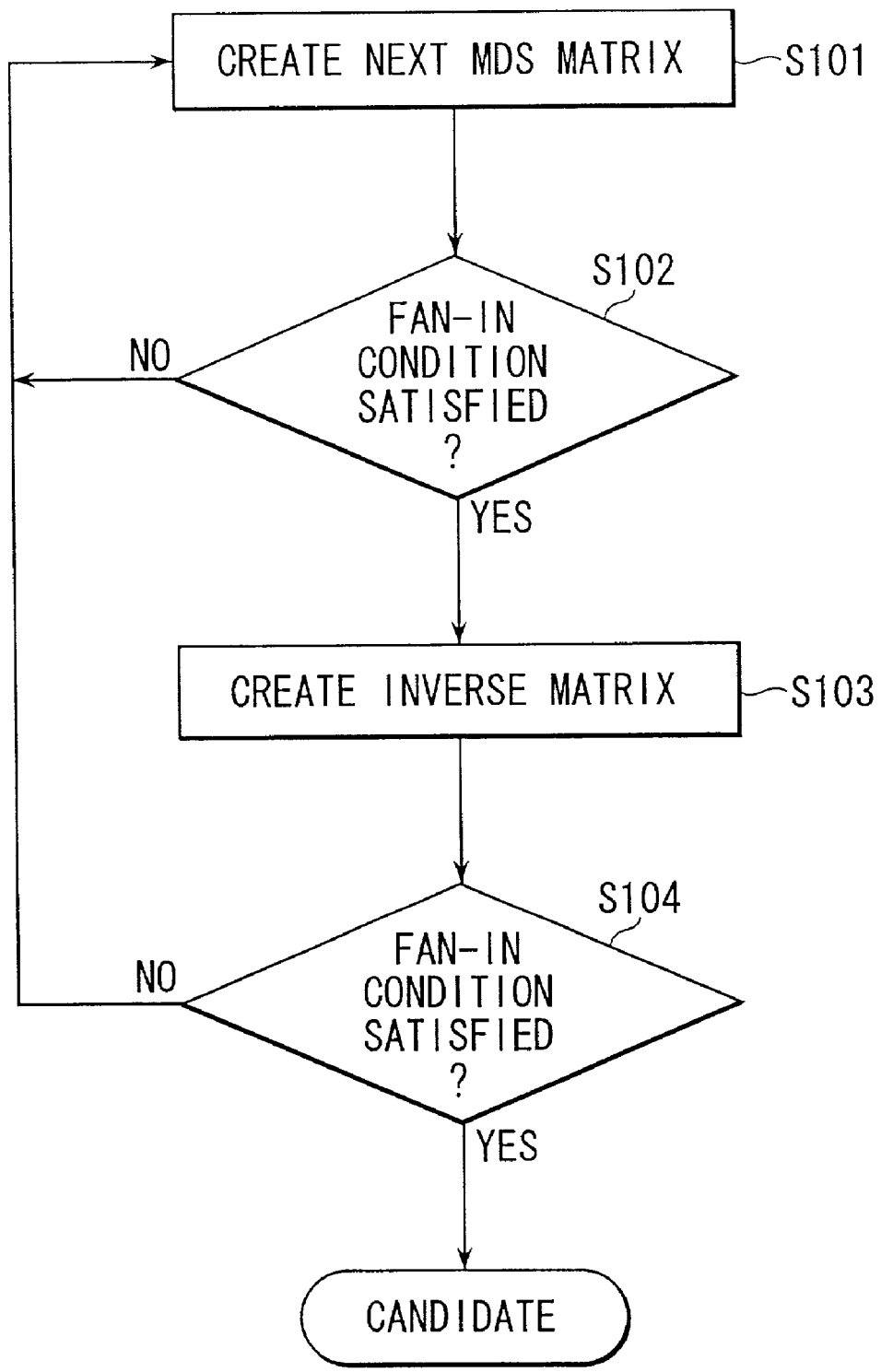
FIG. 40 is a flowchart illustrating a higher-level matrix determination procedure.

FIG. 40 illustrates an example of a procedure for determining higher-level MDS matrices.

Here, the procedure will be described first as determining the arrangement of the encryption apparatus. The arrangement of the decryption apparatus can also be determined (the encryption apparatus and the description apparatus are inverses in arrangement of one another).

In step S101, an MDS matrix for the encryption apparatus is determined according to a given method (e.g., randomly). In step S102, a decision is made as to whether or not the matrix meets a given criterion (for example, the above-mentioned criterion (1)). If not, the matrix is discarded and another matrix is then determined in step S101.

If, on the other hand, the matrix meets the criterion, the inverse matrix of that MDS matrix (i.e., the MDS matrix used in the decryption apparatus) is determined in step S103. In step S104, a decision is then made as to whether or not the inverse matrix meets a given criterion (for example, the above-mentioned criterion (1)). If not, those matrices are discarded and still another matrix is then determined in step S101.

If the criterion is met, those matrices become a candidate for a set of MDS matrices used in the encryption and the decryption apparatus.

A candidate selected from a plurality of candidates obtained by repeating the procedure may be adopted or the first candidate may be used.

To implement a higher-level MDS by actual circuits, connection patterns equivalent to the MDS matrices thus obtained are simply used.

As a variation of the above arrangement, it is also possible to perform a process of replacing bit positions of multiple S-boxes in the same extended S-box (or inserting a circuit having such a function).

The configuration of the higher-level MDS described here is applicable to the encryption and the decryption apparatus having various variations described so far.

For example, the embodiment has been described in terms of the 128-bit block encryption/decryption apparatus or encryption/decryption algorithm in which one extended S-box is made up of two stages of four parallel 8-bit S-boxes and a lower-level MDS (and key addition), four such extended S-boxes are arranged in parallel, and four parallel extended S-boxes and a higher-level MDS are arranged alternately (four parallel extended S-boxes and four parallel extended S-boxes are coupled by a higher-level MDS). The configuration of the higher-level MDS described here is also applicable to the 64-bit block encryption/decryption apparatus or encryption/decryption algorithm in which two such extended S-boxes as described above are arranged in parallel, and two parallel extended S-boxes and a higher-level MDS are arranged alternately (two parallel extended S-boxes and two parallel extended S-boxes are coupled by a higher-level MDS).

To implement such 64-bit block encryption, the four parallel extended S-boxes in the configuration for 128-bit block encryption need merely be replaced by two parallel extended S-boxes with modifications to corresponding portions.

For example, the key length may be set to 128 bits. Another key length, such as 64 or 96 bits, is also possible. The number "R" of stages in this case should preferably be set to six or more.

In the case of 64-bit block encryption, the arrangement of FIGS. 30 to 34 is modified such that the four parallel extended S-boxes are replaced by two parallel extended S-boxes, but the above-mentioned criteria, coupling scheme and connection patterns remain unchanged. The higher-level MDS matrix in FIG. 37 and higher-level MDS matrixes $M_1$ to $M_8$ are changed to a matrix with two rows and two columns. The higher-level MDS matrix representing a linear diffusion is changed correspondingly to a matrix 8 rows and 8 columns. Since the internal arrangement of the extended S-box remains unchanged, the same connection patterns as those in FIGS. 38 and 39A to 39D may be used. Also, the procedure of FIG. 40 remains unchanged.

The block data length may be set to other length than 128 and 64 bits.

The number of parallel S-boxes in the extended S-box may be changed.

Figure 41:
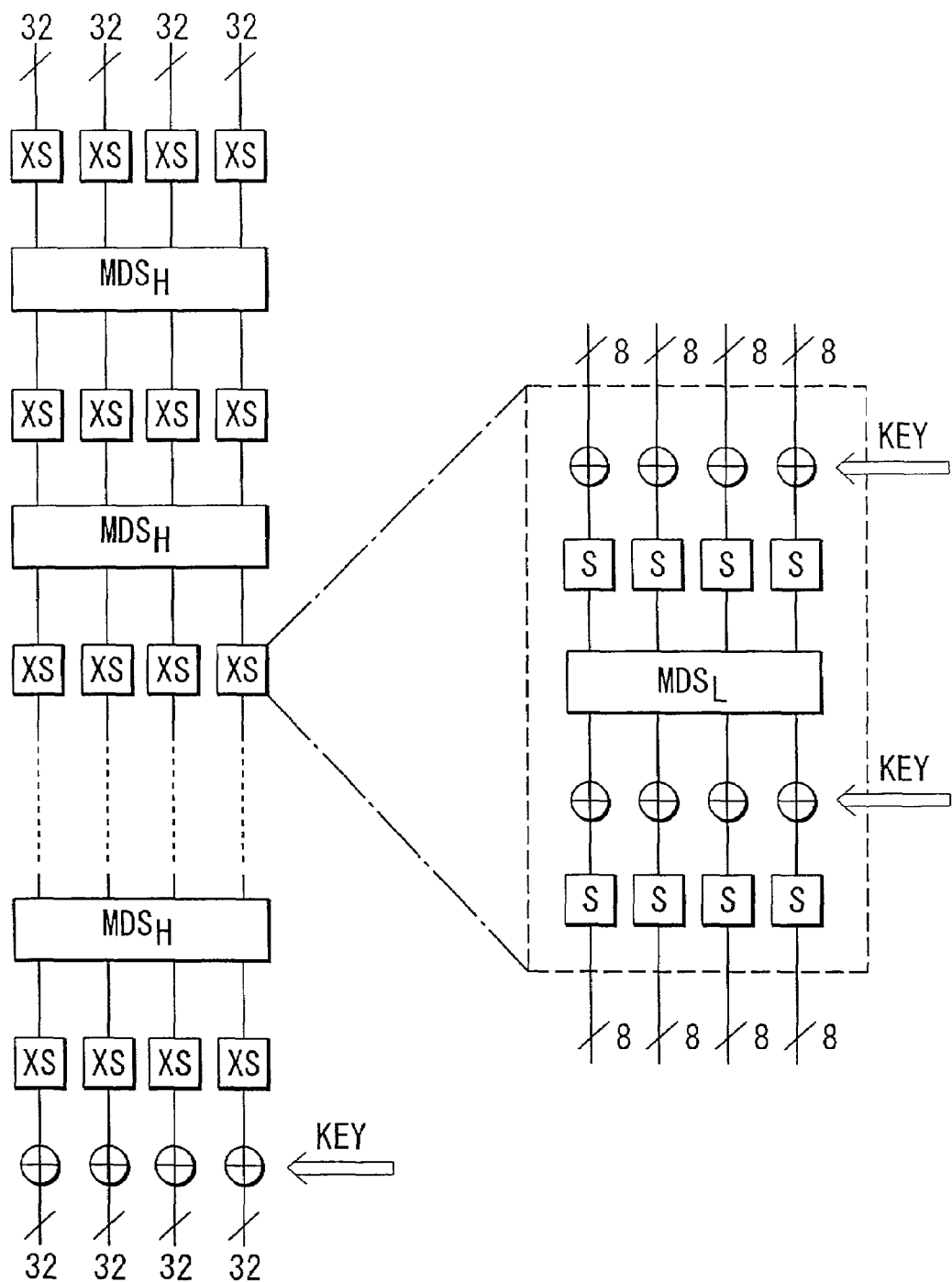
FIG. 41 is a block diagram showing an example of the whole arrangement of an encryption apparatus adapted for encryption of 128-bit block data.

Encryption/decryption apparatus based on the common-key block encryption scheme adapted for encryption of 128-bit block data using the above-mentioned higher-level MDS includes, as shown in FIG. 41, a predetermined number of stages each of which is composed of four first nonlinear transformation units (extended S-boxes XS) each of which performs a local linear diffusion process and a nonlinear transformation process on a corresponding one of four sets of 32-bit data obtained by dividing 128-bit block data into four and a first diffusion unit (a higher-level MDS $MDS_H$) which performs a linear diffusion process using a maximum distance separable matrix on 128-bit block data in which four sets of 32-bit data output from the four first nonlinear transformation units XS are concatenated. The first stage is input with 128-bit plaintext block data and each of the stages receives 128-bit block data processed by the preceding stage. The first diffusion unit $MDS_H$ in the last stage is followed by four first nonlinear transformation units XS to receive 128-bit data from the first diffusion unit $MDS_H$, which in turn are followed by a first key addition section EX-OR which adds 128-bit key data to 128-bit block data obtained by concatenating four sets of 32-bit data output from the four first nonlinear transformation units XS. Each of the first nonlinear transformation units $MDS_H$ includes four second key addition sections EX-OR each of which adds 8-bit key data to a corresponding one of four sets of 8-bit data obtained by dividing one set of 32-bit data into four, four second nonlinear transformation units (S-boxes S) each of which performs nonlinear transformation on a corresponding one of outputs of the second key addition sections using an 8-bit input-output transformation table, a second diffusion unit $MDS_L$ which performs a liner diffusion process using a maximum distance separable matrix on 32-bit data obtained by concatenating four sets of 8-bit data output from the four second nonlinear transformation units S, and four sets of second key addition section EX-OR and second nonlinear transformation section S connected to follow the second diffusion unit $MDS_L$.

The first diffusion unit $MDS_H$ in each stage includes eight 16-bit diffusion sections for each of 8 bits for the second nonlinear transformation units S in preceding and succeeding stages, the 16-bit diffusion section (not shown in FIG. 41 and corresponding to eight MDS matrices 104-1 to 104-8 of FIGS. 28 and 28) performing a linear diffusion process through a 4×4 matrix operation based on multiplication over the Galois field $GF(2^4)$ or its equivalent circuit, the matrix operation being such that four bits at corresponding bits positions in four sets of 8-bit data from the four second nonlinear transformation units S in one first nonlinear transformation section XS in the preceding stage are taken as one element on the input side of the matrix operation and four bits at corresponding bit positions in four sets of 8-bit data input to the four second nonlinear transformation section S in one first nonlinear transformation processing section XS in the succeeding stage are taken as one element on the output side of the matrix operation. The 4×4 matrix operation based on multiplication over the Galois field $GF(2^4)$ in the 16-bit diffusion section or its equivalent circuit is arranged to, in any combination of one bit in the outputs of a total 16 of second nonlinear transformation units in the four first nonlinear transformation processing circuits in the preceding stage and one bit in the inputs of a total 16 of second nonlinear transformation units in the four first nonlinear transformation processing circuits in the succeeding stage, spread the state of that one bit in the preceding stage to that one bit in the succeeding stage over a plurality of operations paths.

Figure 42:
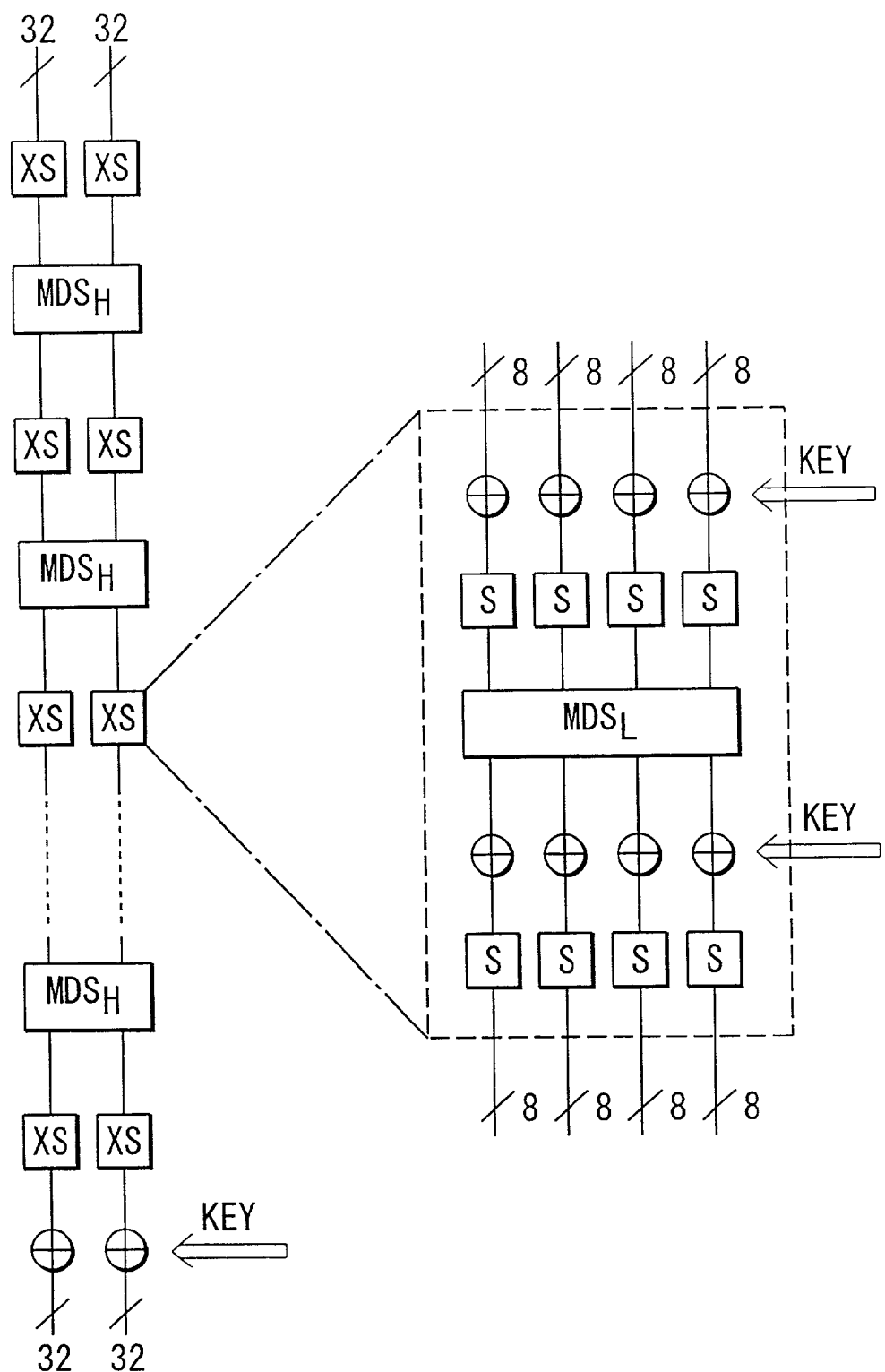
FIG. 42 is a block diagram showing an example of the whole arrangement of an encryption apparatus adapted for encryption of 64-bit block data.

Encryption/decryption apparatus based on the common-key encryption scheme adapted for encryption of 64-bit block data using the above-mentioned higher-level MDS includes, as shown in FIG. 42, a predetermined number of stages each of which is composed of two first nonlinear transformation units XS each of which performs a local linear diffusion process and a nonlinear transformation process on a corresponding one of two sets of 32-bit data obtained by dividing 64-bit block data into four and a first diffusion unit $MDS_H$ which performs a linear diffusion process using a maximum distance separable matrix on 64-bit block data in which two sets of 32-bit data output from the four first nonlinear transformation units are concatenated. The first stage is input with 64-bit plaintext block data and each of the stages receives 64-bit block data processed by the preceding stage. The first diffusion unit $MDS_H$ in the last stage is followed by two first nonlinear transformation units XS to receive 64-bit data from the first diffusion unit, which in turn are followed by a first key addition section EX-OR which adds 64-bit key data to 64-bit block data obtained by concatenating two sets of 32-bit data output from the four first nonlinear transformation units. Each of the first nonlinear transformation units XS includes four second key addition sections EX-OR each of which adds 8-bit key data to a corresponding one of four sets of 8-bit data obtained by dividing one set of 32-bit data into four, four second nonlinear transformation units S each of which performs nonlinear transformation on a corresponding one of outputs of the second key addition sections EX-OR using an 8-bit input-output transformation table, a second diffusion unit $MDS_L$ which performs a liner diffusion process using a maximum distance separable matrix on 32-bit data obtained by concatenating four sets of 8-bit data output from the four second nonlinear transformation units S, and four sets of second key addition section EX-OR and second nonlinear transformation section S connected to follow the second diffusion unit $MDS_L$.

The first diffusion unit $MDS_H$ in each stage includes an 8-bit diffusion section for each of 8 bits for the second nonlinear transformation units S in preceding and succeeding stages, the 8-bit diffusion section (not shown in FIG. 42 and each corresponding to two extended S-boxes 103 of FIGS. 28 and 28) performing a linear diffusion process through a 2×2 matrix operation based on multiplication over the Galois field $GF(2^4)$ or its equivalent circuit, the matrix operation being such that four bits at corresponding bits positions in four sets of 8-bit data from the four second nonlinear transformation units S in one first nonlinear transformation section XS in the preceding stage are taken as one element on the input side of the matrix operation and four bits at corresponding bit positions in four sets of 8-bit data input to the four second nonlinear transformation section S in one first nonlinear transformation processing section XS in the succeeding stage are taken as one element on the output side of the matrix operation. The 2×2 matrix operation based on multiplication over the Galois field $GF(2^4)$ in the 16-bit diffusion section or its equivalent circuit is arranged to, in any combination of one bit in the outputs of a total 8 of second nonlinear transformation processing units S in the two first nonlinear transformation processing circuits XS in the preceding stage and one bit in the inputs of a total 8 of second nonlinear transformation units S in the two first nonlinear transformation processing circuits XS in the succeeding stage, spread the state of that one bit in the preceding stage to that one bit in the succeeding stage over a plurality of operations paths.

The hardware arrangement and software arrangement of this embodiment will be explained below.

The encryption and decryption apparatuses of this embodiment are implemented by either hardware or software.

Upon software implementation, this embodiment are applied to a computer readable recording medium which records a program which implements the encryption or decryption apparatus and makes a computer execute predetermined means (or makes a computer function as predetermined means, or makes a computer implement predetermined functions).

Upon hardware implementation, the encryption or decryption apparatus are formed as a semiconductor device.

When an encryption or decryption apparatus to which the present invention is applied is constructed, or when an encryption or decryption program is prepared, all blocks or modules exemplified in FIGS. 4 and 24 may be individually created. Alternatively, one or an appropriate number of blocks or modules having identical arrangement may be prepared, and may be shared (commonly used) by respective portions of the algorithm.

In case of software implementation, multi-processors may be used to execute parallel processes, thus achieving high-speed processing.

Note that an apparatus which has an encryption function but no decryption function, an apparatus which has a decryption function but no encryption function, or an apparatus which has both the encryption and decryption functions are constructed. Likewise, a program which has an encryption function but no decryption function, a program which has a decryption function but no encryption function, or a program which has both the encryption and decryption functions are prepared.

Applications of this embodiment to systems will be explained below.

The encryption system of this embodiment are basically applied to every systems.

Figure 43:
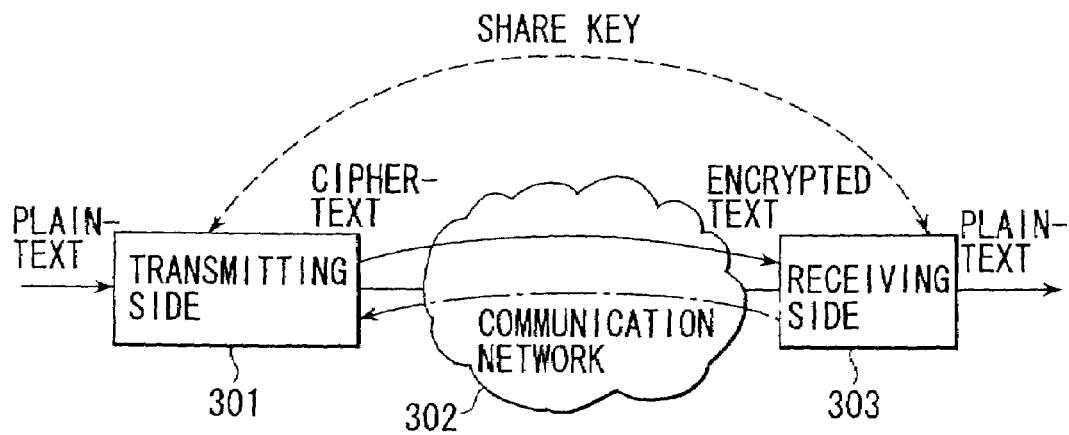
FIG. 43 shows an example of a system using the encryption system of the present invention.

For example, as shown in FIG. 43, a key is securely shared between a transmitting apparatus 301 and receiving apparatus 303 by a predetermined method or procedure. The transmitting apparatus 301 encrypts transmission data in units of block length by the encryption system of this embodiment, and transmits encrypted data to the receiving apparatus 303 via a communication network 302 in accordance with a predetermined protocol. Upon receiving encrypted data, the receiving apparatus 303 decrypts the received encrypted data in units of block lengths by the encryption system of this embodiment to reproduce original plaintext. Note that when these apparatuses have both the encryption and decryption functions, they can make two-way encryption communications.

Figure 44:
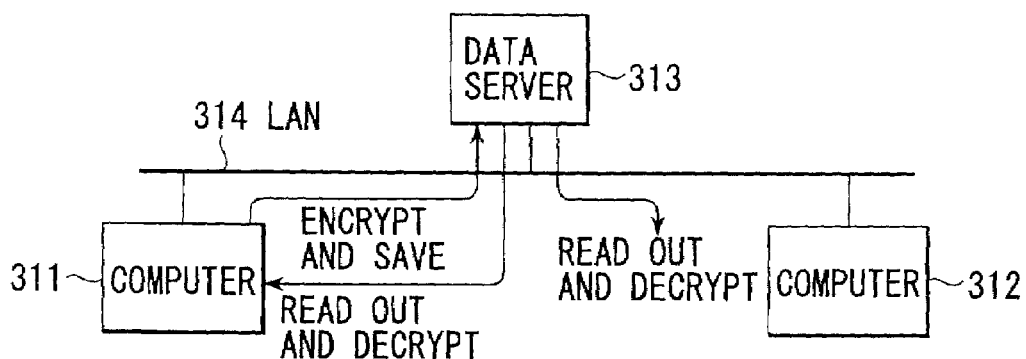
FIG. 44 shows another example of a system using the encryption system of the present invention.

For example, as shown in FIG. 44, a computer 311 generates a key by a predetermined method, encrypts data to be saved in units of block lengths by the encryption system of this embodiment, and saves the encrypted data in a data server 313 via a predetermined network (e.g., a LAN, Internet, or the like) 314. Upon reading the saved data, the computer 311 reads desired encrypted data from the data server 313, and decrypts the read data in units of block lengths by the encryption system of this embodiment to reproduce original plaintext. If another computer 312 knows this key, it can similarly decrypt and reproduce plaintext.

However, other computers which do not know the key cannot decrypt the encrypted data, thus achieving security control of information.

Figure 45:
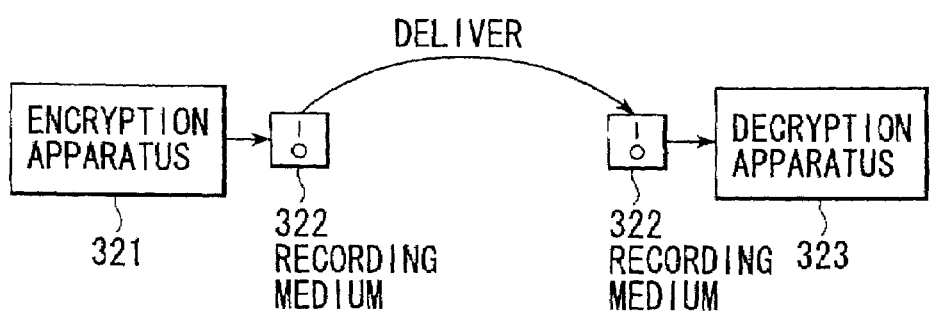
FIG. 45 shows still another example of a system using the encryption system of the present invention.

For example, as shown in FIG. 45, for the contents provider, an encryption apparatus 321 encrypts given contents using a given key in units of block lengths by the encryption system of this embodiment, records the encrypted contents in recording media 322, and delivers these media to users. The user who acquired the recording medium 322 acquires the key by a predetermined method, and decrypts the contents in units of block lengths by the encryption system of this embodiment using a decryption apparatus 323, thus browsing or playing back the contents.

Also, the present invention are applied to various other systems.

Note that the arrangements described in this embodiment are merely examples, and do not exclude other arrangements, and other arrangements obtained by replacing some components of the exemplified arrangement by other ones, omitting some components of the exemplified arrangement, adding other functions to the exemplified arrangement, or combining them are also available. Also, another arrangement theoretically equivalent to the exemplified arrangement, another arrangement including portions theoretically equivalent to the exemplified arrangement, another arrangement theoretically equivalent to principal part of the exemplified arrangement, and the like are available. Furthermore, another arrangement that achieves the same or similar objects as or to that of the exemplified arrangement, another arrangement that can provide the same or similar effects as or to those of the exemplified arrangement, and the like are available.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for encrypting block data of a first bit length comprsing:
encrypting sections connected in series, each of the encrypting sections comprising,
first units each configured to randomize first subblock data of a second bit length which are obtained by dividing the block data of the first bit length, and
a second unit configured to receive plural items of the randomized first subblock data output from the first units, the received plural items of the randomized first subblock data being of the first bit length, to diffuse the received plural items of the randomized first subblock data of the first bit length and to supply a result of diffusion to first units in a succeeding encrypting section, and wherein each of the first units comprises
first subunits each configured to randomize second subblock data of a third bit length which are obtained by dividing the first subblock data of the second bit length,
a second subunit configured to receive plural items of the randomized second subblock data output from the first subunits, the received plural items of the randomized second subblock data being of the second bit length and to diffuse the received plural items of the randomized second subblock data of the second bit length, and third subunits configured to receive the diffused second subblock data of the second bit length which is output from the second subunit and each configured to randomize the second subblock data of the third bit length, and
wherein any one of the first subunits is connected to any one of the first subunits in the succeeding encrypting section via at least two paths.

2. An apparatus for encrypting block data of a first bit length, the apparatus comprising:
encrypting sections connected in series, each of the encrypting sections comprising,
first nonlinear transformation units each configured to perform a nonlinear transformation process for first subblock data of a second bit length which are obtained by dividing the block data of the first bit length, and
a first linear diffusion unit configured to receive plural items of the processed first subblock data output from the first nonlinear transformation units, the received plural items of the processed fist subblock data being of the first bit length, to perform a linear diffusion process for the received plural items of the processed first subblock data of the first bit length and to supply a result of the linear diffusion process to first nonlinear transformation units in a succeeding encrypting section,
wherein each of the first nonlinear transformation units comprises,
second nonlinear transformation units each configured to perform a nonlinear transformation process for second subblock data of a third bit length which are obtained by dividing the first subblock data of the second bit length,
a second linear diffusion unit configured to receive plural items of the processed second subblock data output from the second nonlinear transformation units, the received plural items of the processed second subblock data being of the second bit length and to perform a linear diffusion process for the received plural items of the processed second subblock data,
third nonlinear transformation units configured to receive the processed second subblock data of the second bit length which is output from the second linear diffusion unit and each configured to perform a nonlinear transformation process for second subblock data of the third bit length,
wherein any one of the second nonlinear transformation units is connected to any one of the second nonlinear transformation units in the succeeding encrypting section via at least two paths.

3. The apparatus according to claim 2, wherein the first bit length is 128 bits the second bit length is 32 bits, and the third bit length is 8 bits.

4. The apparatus according to claim 2, wherein the first linear diffusion unit and the second linear diffusion unit are implemented by hardware.

5. The apparatus according to claim 4, wherein an input-output characteristic of the first linear diffusion unit and the second linear diffusion unit are based on multiplication in a Galois field.

6. The apparatus according to claim 2, wherein the first linear diffusion unit and the second linear diffusion unit are implemented by software.

7. An apparatus for encrypting block data of 128 bits, the apparatus comprsing:
encrypting sections connected in series, each of the encrypting sections including, four first nonlinear transformation units each configured to perform a nonlinear transformation process for first subblock data of 32 bits which are obtained by dividing the block data, and a first linear diffusion unit configured to receive plural items of the processed first subblock data output from the four first nonlinear transformation units, to perform a linear diffusion process for the received plural items of the processed first subblock data of 32 bits and to supply a result of the linear diffusion process to four first nonlinear transformation units in a succeeding encrypting section;

a key addition unit which adds key data of 128 bits to output data of 128 bits from the encrypting section of a last stage, wherein an encrypting section of the last stage comprises four nonlinear transformation units each configured to perform a nonlinear transformation process for the first subblock data of 32 bits, wherein each of the first nonlinear transformation units includes stage sections, each stage section including, four second nonlinear transformation units each configured to perform a nonlinear transformation process for second subblock data of 8 bits which are obtained by dividing the first subblock data, a second linear diffusion unit configured to receive plural items of the processed second subblock data output from the four second nonlinear transformation units, the received plural items of the processed second subblock data being 32 bits in length, and to perform a linear diffusion process for the received plural items of the processed second subblock data, third nonlinear transformation units configured to receive the processed second subblock data which is output from the second linear diffusion unit and each configured to perform a nonlinear transformation process for second subblock data being 8 bits in length, and an adder for adding a key to four second subblock data of 8 bits input to the four second nonlinear transformation units, wherein a stage section of the last stage comprises four second nonlinear transformation units each configured to perform a nonlinear transformation process for the second subblock data;

wherein any one of the four second nonlinear transformation units is connected to any one of the four second nonlinear transformation units in the succeeding encrypting section via at least two paths, and wherein each of the four first nonlinear transformation units divides input data of 32 bits into eight groups of data of 4 bits which are formed of extracting the input data by every 8 bits, and the first linear diffusion unit comprises eight subunits each subunit receiving corresponding four groups of data of 4 bits output from the four first nonlinear transformation units, performing a 4×4 matrix operation based on multiplication over a Galois field $GF(2^4)$ for the received four groups of data of 4 bits, and outputting four groups of data of 4 bits to corresponding four first nonlinear transformation units of the succeeding encrypting section.

8. An apparatus for encrypting block data of 64 bits, the apparatus comprising:

encrypting sections connected in series, each of the encrypting sections including, two first nonlinear transformation units each configured to perform a nonlinear transformation process for first subblock data of 32 bits which are obtained by dividing the block data, and a first linear diffusion unit configured to receive plural items of the processed first subblock data output from the two first nonlinear transformation units, perform a linear diffusion process for the received plural items of the processed first subblock data of 32 bits and to supply a result of the linear diffusion process to two first nonlinear transformation units in a succeeding encrypting section;

a key addition unit which adds key data of 128 bits to output data of 64 bits from the encrypting section of a last stage, wherein an encrypting section of the last stage comprises two nonlinear transformation units each configured to perform a nonlinear transformation process for the first subblock data of 32 bits, wherein each of the first nonlinear transformation units includes stage sections, each stage section including, four second nonlinear transformation units each configured to perform a nonlinear transformation process for second subblock data of 8 bits which are obtained by dividing the first subblock data, a second linear diffusion unit configured to receive plural items of the processed second subblock data output from the four second nonlinear transformation units, the received plural items of the processed second subblock data being 32 bits in length, and to perform a linear diffusion process for the received plural items of the processed second subblock data being 32 bits in length, third nonlinear transformation units configured to receive the processed second subblock data which is output from the second linear diffusion unit and each configured to perform a nonlinear transformation process for second subblock data being 8 bits in length, and an adder for adding a key to four second subblock data of 8 bits input to the four second nonlinear transformation units, wherein a stage section of the last stage comprises four second nonlinear transformation units each configured to perform a nonlinear transformation process for the second subblock data, wherein any one of the four second nonlinear transformation units is connected to any one of the four second nonlinear transformation units in the succeeding encrypting section via at least two paths, and wherein each of the two first nonlinear transformation units divides input data of 32 bits into eight groups of data of 4 bits which are formed of extracting the input data by every 8 bits, and the first linear diffusion unit includes eight subunits each subunit receiving corresponding two groups of data of 4 bits output from the two first nonlinear transformation units, performing a 2×2 matrix operation based on multiplication over a Galois field $GF(2^4)$ for the received two groups of data of 4 bits, and outputting two groups of data of 4 bits to corresponding two first nonlinear transformation units of the succeeding encrypting section.

9. An apparatus for decrypting encrypted block data of a first bit length, the apparatus comprising:

decrypting sections connected in series, each of the decrypting sections comprising, first units each configured to randomize first subblock data of a second bit length which are obtained by dividing encrypted block data of the first bit length, and a second unit configured to receive plural items of the randomized first subblock data output from the first units, the received plural items of the randomized first subblock data being of the first bit length, to diffuse the received plural items of the randomized first subblock data of the first bit length and to supply a result of diffusion to first units in a succeeding decrypting section, and wherein each of the first units comprises first subunits each configured to randomize second subblock data of a third bit length which are obtained by dividing the first subblock data of the second bit length, a second subunit configured to receive plural items of the randomized second subblock data output from the first subunits, the received plural items of the randomized second subblock data being of the second bit length and to diffuse the received plural items of the randomized second subblock data of the second bit length, and third subunits configured to receive the diffused second subblock data of the second bit length which is output from the second subunit and each configured to randomize the second subblock data of the third bit length, and wherein any one of the first subunits is connected to any one of the first subunits in the succeeding decrypting section via at least two paths.

* * * * *